United States Patent
Jia et al.

(10) Patent No.: US 12,028,197 B2
(45) Date of Patent: Jul. 2, 2024

(54) GUARD BAND INDICATION METHOD AND APPARATUS

(71) Applicant: Huawei Technologies Co., Ltd., Shenzhen (CN)

(72) Inventors: Qiong Jia, Shanghai (CN); Jiayin Zhang, Shanghai (CN); Ji Wu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 368 days.

(21) Appl. No.: 17/334,418

(22) Filed: May 28, 2021

(65) Prior Publication Data

US 2021/0288852 A1    Sep. 16, 2021

Related U.S. Application Data

(63) Continuation of application No. PCT/CN2019/116845, filed on Nov. 8, 2019.

(30) Foreign Application Priority Data

Nov. 30, 2018   (CN) .......................... 201811451586.8

(51) Int. Cl.
*H04L 27/26* (2006.01)
*H04W 72/0453* (2023.01)
*H04W 72/23* (2023.01)

(52) U.S. Cl.
CPC .... *H04L 27/2607* (2013.01); *H04L 27/26025* (2021.01); *H04W 72/0453* (2013.01); *H04W 72/23* (2023.01)

(58) Field of Classification Search
CPC ......... H04L 27/2607; H04L 27/26025; H04W 72/23; H04W 72/0453
See application file for complete search history.

(56) References Cited

U.S. PATENT DOCUMENTS

| | | | |
|---|---|---|---|
| 11,653,216 B2 * | 5/2023 | Yerramalli | ............ H04W 16/14 370/329 |
| 2010/0329384 A1 * | 12/2010 | Kwak | .................. H04L 5/0041 375/295 |

(Continued)

FOREIGN PATENT DOCUMENTS

| | | |
|---|---|---|
| CN | 103312482 A | 9/2013 |
| CN | 107852720 A | 3/2018 |

(Continued)

OTHER PUBLICATIONS

"DL design for NR-U," 3GPP TSG RAN WG1 Meeting #94, Gothenburg, Sweden, R1-1808897, Total 4 pages, 3rd Generation Partnership Project, Valbonne, France (Aug. 20-24, 2018).

(Continued)

*Primary Examiner* — Michael J Moore, Jr.
(74) *Attorney, Agent, or Firm* — Leydig, Voit & Mayer, Ltd.

(57) ABSTRACT

A guard band indication method on an unlicensed spectrum is described that includes: a network device generating one or any combination of the following four types of information on the unlicensed spectrum: an indication of bandwidth configuration information, an indication of available bandwidth information, an indication of unavailable bandwidth information, or an indication of guard band information; and the network device sends the one or any combination of the foregoing four types of generated information. The one or any combination of the four types of information is used to determine a guard band that is based on a listen before talk (LBT) result.

14 Claims, 15 Drawing Sheets

(56) References Cited

U.S. PATENT DOCUMENTS

| | | | |
|---|---|---|---|
| 2017/0079026 A1* | 3/2017 | Li | H04W 8/005 |
| 2018/0049067 A1 | 2/2018 | He et al. | |
| 2019/0141705 A1* | 5/2019 | Dalipi | H04W 72/0453 |
| 2019/0239198 A1* | 8/2019 | Zhang | H04W 72/23 |
| 2019/0268198 A1 | 8/2019 | Oketani | |
| 2019/0274162 A1* | 9/2019 | Zhang | H04W 74/0808 |
| 2020/0059961 A1* | 2/2020 | Do | H04W 72/0453 |
| 2021/0288852 A1* | 9/2021 | Jia | H04L 27/26025 |
| 2021/0400722 A1* | 12/2021 | Grant | H04L 27/0006 |

FOREIGN PATENT DOCUMENTS

| | | |
|---|---|---|
| CN | 108289336 A | 7/2018 |
| CN | 108811139 A | 11/2018 |
| EP | 1855403 A1 | 11/2007 |
| WO | 2017075829 A1 | 5/2017 |
| WO | 2017135885 A1 | 8/2017 |
| WO | 2018021008 A1 | 2/2018 |
| WO | 2018137697 A1 | 8/2018 |

OTHER PUBLICATIONS

"Spectrum utilization for wideband operation and CA scenarios," 3GPP TSG-RAN WG4 Meeting #85, Reno, Nevada, USA, R4-1713689, Total 5 pages, 3rd Generation Partnership Project, Valbonne, France (Nov. 27-Dec. 1, 2017).

"Wideband and CA Operation for NR," 3GPP TSG-RAN WG4 RAN Ad-hoc#3, Nagoya, Japan, R4-1709722, Total 2 pages, 3rd Generation Partnership Project, Valbonne, France (Sep. 21-25, 2017).

"3rd Generation Partnership Project; Technical Specification Group Services and System Aspects; Release 14 Description; Summary of Rel-14 Work Items (Release 14)," 3GPP TR 21.914 V1.1.0, total 104 pages, 3rd Generation Partnership Project, Valbonne, France (Feb. 2018).

"3rd Generation Partnership Project; Technical Specification Group Radio Access Network; NR; Physical layer procedures for data (Release 15)," 3GPP TS 38.214 V15.3.0, total 96 pages, 3rd Generation Partnership Project, Valbonne, France (Sep. 2018).

"3rd Generation Partnership Project; Technical Specification Group Radio Access Network; NR; Base Station (BS) radio transmission and reception (Release 15)," 3GPP TS 38.104 V15.3.0, total 151 pages, 3rd Generation Partnership Project, Valbonne, France (Sep. 2018).

"3rd Generation Partnership Project; Technical Specification Group Radio Access Network; NR; Multiplexing and channel coding (Release 15)," 3GPP TS 38.212 V15.3.0, total 99 pages, 3rd Generation Partnership Project, Valbonne, France (Sep. 2018).

"3rd Generation Partnership Project; Technical Specification Group Radio Access Network; NR; Radio Resource Control (RRC) protocol specification (Release 15)," 3GPP TS 38.331 V15.3.0, total 445 pages, 3rd Generation Partnership Project, Valbonne, France (Sep. 2018).

"3rd Generation Partnership Project; Technical Specification Group Radio Access Network; Physical layer procedures for shared spectrum channel access (Release 15)," 3GPP TS 37.213 V15.1.0, total 20 pages, 3rd Generation Partnership Project, Valbonne, France (Sep. 2018).

"3rd Generation Partnership Project; Technical Specification Group Radio Access Network; NR; User Equipment (UE) radio transmission and reception; Part 1: Range 1 Standalone (Release 15)," 3GPP TS 38.101-1 V15.3.0, total 219 pages, 3rd Generation Partnership Project, Valbonne, France (Sep. 2018).

RAN1, "LS on wideband carrier operation for NR-U," 3GPP TSG RAN WG1 Meeting #94bis, Chengdu, China, R1-1812026, total 2 pages, 3rd Generation Partnership Project, Valbonne, France (Oct. 8-12, 2018).

Ericsson, "Frame structure for NR-U," 3GPP TSG-RAN WG1 Meeting #94bis, Chengdu, China, R1-1811298, total 10 pages, 3rd Generation Partnership Project, Valbonne, France (Oct. 8-12, 2018).

"UL PHY channels for NR unlicensed," 3GPP TSG RAN WG1 Meeting #95, Spokane, US, R1-1812193, Total 22 pages, 3rd Generation Partnership Project, Valbonne, France (Nov. 12-16, 2018).

"Discussion on physical UL channel design in unlicensed spectrum," 3GPP TSG RAN WG1 Meeting #95, Spokane, US, R1-1812299, Total 11 pages, 3rd Generation Partnership Project, Valbonne, France (Nov. 12-16, 2018).

"Discussion on DL signals for NR-U," 3GPP TSG RAN WG1 Meeting #95, Spokane, USA, R1-1813361, Total 3 pages, 3rd Generation Partnership Project, Valbonne, France (Nov. 12-16, 2018).

Huawei et al., "Discussion on BWP operation for NR-U," 3GPP TSG-RAN WG2 # 103bis, Chengdu, China, R2-1814859, Total 3 pages, 3rd Generation Partnership Project, Valbonne, France (Oct. 8-12, 2018).

KR/20217020433, Office Action, mailing date Apr. 25, 2024.

* cited by examiner

GUARD BAND INDICATION METHOD AND APPARATUS

CROSS-REFERENCE TO RELATED APPLICATIONS

This application is a continuation of International Application No. PCT/CN2019/116845, filed on Nov. 8, 2019, which claims priority to Chinese Patent Application No. 201811451586.8, filed on Nov. 30, 2018. The disclosures of the aforementioned applications are hereby incorporated by reference in their entireties.

TECHNICAL FIELD

This application relates to the field of wireless communications technologies, and in particular, to a guard band indication method, a related device, and a system.

BACKGROUND

Rapid development of wireless communications technologies leads to an increasing shortage of spectrum resources, and promotes exploration of unlicensed bands. For an unlicensed band, transmission in a wideband greater than 20 MHz is supported. In addition, a communications system deployed on an unlicensed spectrum usually uses or shares a radio resource in a contention manner. Usually, before sending a signal, a station first listens to whether the unlicensed spectrum is idle, for example, determines a busy/idle state of the unlicensed spectrum based on receive power on the unlicensed spectrum. If the receive power is less than a specific threshold, the station considers that the unlicensed spectrum is in the idle state, and may send a signal on the unlicensed spectrum. Otherwise, the station sends no signal. This listen before transmit mechanism is referred to as listen before talk (LBT). Due to uncertainty of an LBT result, for a wideband carrier, narrowband interference may exist in a part of a bandwidth, that is, only a part of the bandwidth is in the idle state. Therefore, a device can perform transmission only in the part of the idle bandwidth (a gray subband in FIG. 1). As shown in FIG. 1, transmission of another device in a blank subband causes narrowband interference, and there is a potential risk of a signal leakage and mutual interference between the device and a narrowband interfering device in a wideband.

SUMMARY

A technical problem to be resolved in this application is to reduce channel interference, for example, narrowband interference, on an unlicensed spectrum.

According to an aspect, a guard band indication method on an unlicensed spectrum is provided. The method includes: A network device generates one or any combination of the following four types of information on the unlicensed spectrum: an indication of bandwidth configuration information, an indication of available bandwidth information, an indication of unavailable bandwidth information, or an indication of guard band information; and the network device sends the one or any combination of the foregoing four types of generated information, where the one or any combination of the four types of information is used to determine a guard band that is based on a listen before talk LBT result. Further, the method may further include: sending data in an actual resource position range within an available bandwidth in the bandwidth and beyond the guard band.

Correspondingly, according to another aspect, a method for determining a guard band on an unlicensed spectrum is provided. The method includes: A terminal receives one or any combination of the following four types of information on the unlicensed spectrum: an indication of bandwidth configuration information, an indication of available bandwidth information, an indication of unavailable bandwidth information, or an indication of guard band information; and the terminal determines, based on the one or any combination of the four types of information, a guard band that is based on a listen before talk LBT result. Further, the method may further include: receiving data in an actual resource position range within an available bandwidth in the bandwidth and beyond the guard band.

Optionally, one or more of the indication of the bandwidth configuration information, the indication of the available bandwidth information, the indication of the unavailable bandwidth information, or the guard band information are carried in a system message, RRC, or DCI.

In addition, a standard may specify a possible size and a possible position of the available bandwidth or the unavailable bandwidth that is based on a listen before talk LBT result, or a size and a position of a guard band based on the available bandwidth or the unavailable bandwidth, and predefine resources corresponding to different values of the indication of the bandwidth configuration information, resources corresponding to different values of the indication of the available bandwidth information, resources corresponding to different values of the indication of the unavailable bandwidth information, or resources corresponding to different values of the indication of the guard band information. According to the foregoing definition, related indications or indication complexity can be reduced to some extent, thereby reducing communication resource overheads.

According to other aspects, this application further provides an apparatus, a computer-readable storage medium, and the like that can perform the foregoing methods.

During implementation of illustrative examples of this application, scheduling of uplink resources can be more flexible for use of an unlicensed band, while an OCB requirement of ETSI is met. Further, resource utilization can be improved.

BRIEF DESCRIPTION OF DRAWINGS

To describe technical solutions in illustrative examples of this application or in the background more clearly, the following describes the accompanying drawings used in the illustrative examples of this application or the background.

DESCRIPTION OF EMBODIMENTS

Terms used in the illustrative examples of this application are merely used to explain specific illustrative examples of this application, but are not intended to limit this application.

For ease of subsequent description, for acronyms and abbreviations and key terms in this specification, refer to the following table:

For ease of understanding implementation of this application, a wireless communications system in the illustrative examples of this application is first described.

Figure 1:
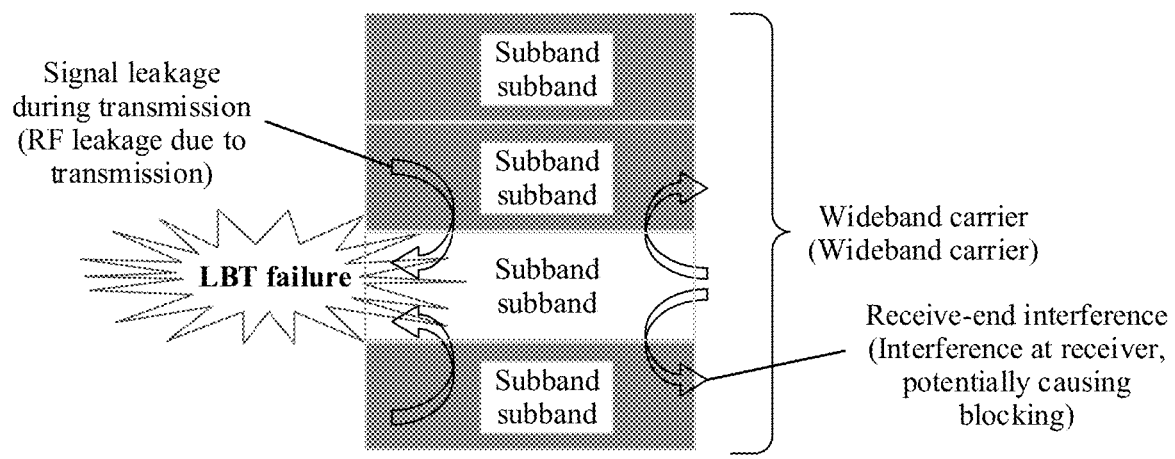
FIG. 1 is a schematic diagram of an existing resource allocation manner according to this application.
Figure 2:
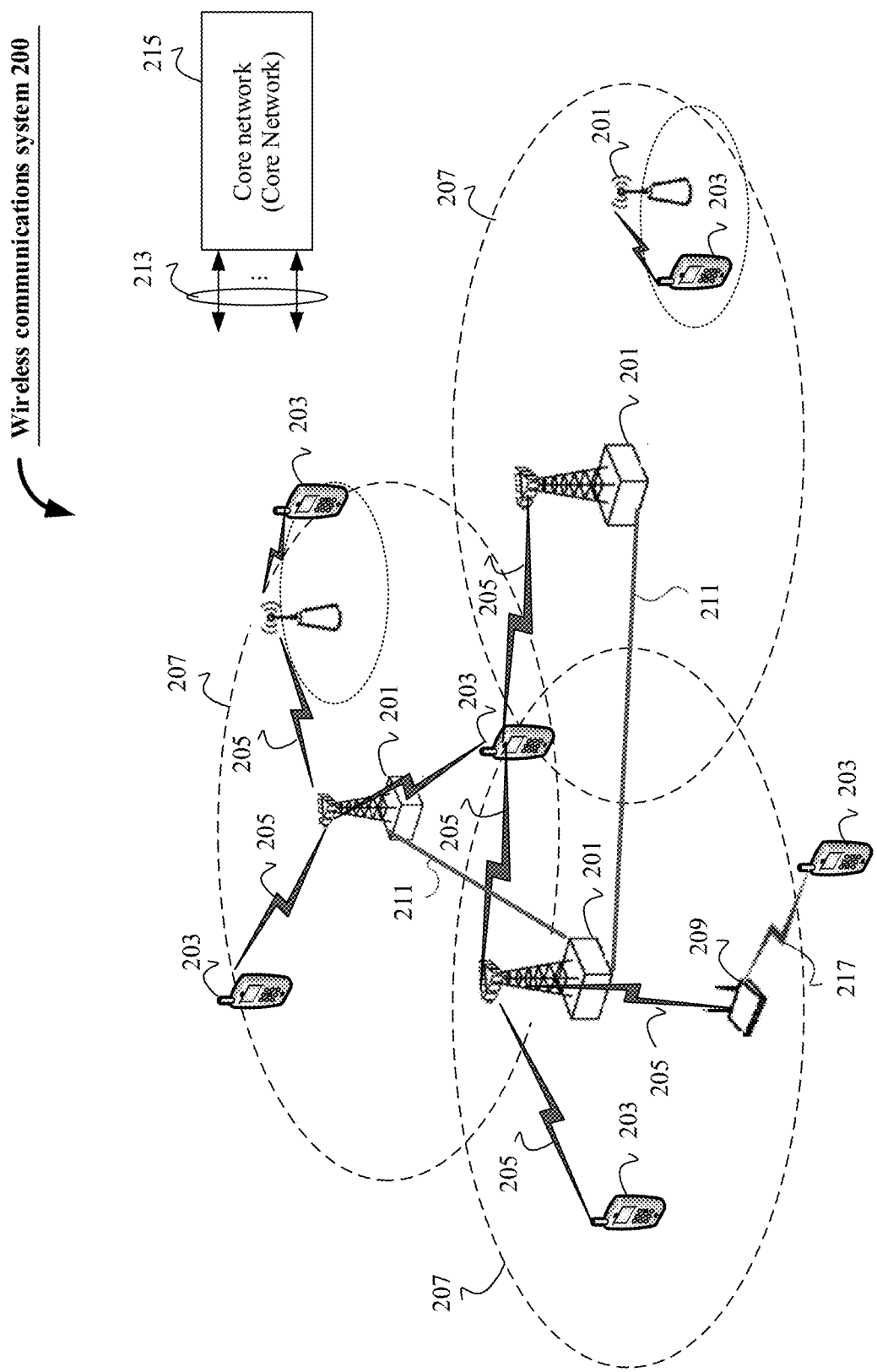
FIG. 2 is a schematic architectural diagram of a wireless communications system according to this application.

FIG. 2 shows a wireless communications system 200 in this application. The wireless communications system 200 may operate in a licensed band or an unlicensed band. It may be understood that use of the unlicensed band can improve a system capacity of the wireless communications system 200. As shown in FIG. 2, the wireless communications system 200 includes one or more network devices 201, for example, a base station, a NodeB, an eNodeB, a WLAN access point, a wireless relay node, a wireless backhaul node, one or more terminals 203, and a core network 215.

The network device 201 may be configured to communicate with the terminal 203 under control of a base station controller (not shown). In some illustrative examples, the base station controller may be a part of the core network 215 or be integrated into the base station 201.

The network device 201 may be configured to transmit control information or user data to the core network 215 through a backhaul interface (e.g., an Si interface) 213.

The network device 201 may perform wireless communication with the terminal 203 by using one or more base station antennas. Each base station 201 may provide com-

| English acronyms and abbreviations | Full English expression/ Standard English term | Chinese expression/ Chinese term |
|---|---|---|
| 3GPP | 3rd Generation Partnership Project | 3rd generation partnership project |
| NR | New RAT (Radio Access Technology) | New radio access technology |
| NR-U | NR unlicensed band | New radio unlicensed band access technology |
| LTE | Long Term Evolution | Long term evolution |
| LTE-A | LTE-Advanced | LTE-advanced |
| ETSI | European telecommunications standards institute | European telecommunications standards institute |
| WLAN | Wireless Local Area Network | Wireless local area network |
| Wi-Fi | Wireless Fidelity | Wireless fidelity |
| LAA | Licensed-Assisted Access | Licensed-assisted access |
| eLAA | enhanced LAA | Enhanced licensed-assisted access |
| OCB | occupied channel bandwidth | Channel bandwidth occupancy |
| MCOT | maximum channel occupancy time | Maximum channel occupancy time |
| TXOP | transmission opportunity | Transmission opportunity |
| LBT | Listen before talk | Listen before talk |
| SFI | Slot Format Indication | Slot format indication |
| BWP | Bandwidth Part | Bandwidth part |
| BW | Bandwidth | Bandwidth |
| UL | Uplink | Uplink |
| DL | Downlink | Downlink |
| gNB | gNodeB | 5G (fifth generation) base station |
| UE | User Equipment | User equipment |
| TDD | Time Division Duplex | Time division duplex |
| FDD | Frequency Division Duplex | Frequency division duplex |
| SUL | Supplementary Uplink | Supplementary uplink |
| DCI | Downlink Control Information | Downlink control information |
| PDCCH | Physical Downlink Control Channel | Physical donwlink control channel |
| PUCCH | Physical uplink Control Channel | Physical uplink control channel |
| C-PDCCH | Common PDCCH | Common PDCCH |
| GC-PDCCH | Group Common PDCCH | Group common PDCCH |
| SFI-PDCCH | Slot Format Indication PDCCH | Slot structure indication PDCCH |
| OFDM | Orthogonal Frequency Division Multiplexing | Orthogonal frequency division multiplexing |
| SCS | Subcarrier Spacing | Subcarrier spacing |
| RB | Resource block | Resource block |
| RBG | RB group | Resource block group |
| RRC | Radio Resource Control | Radio resource control |
| MAC | Media Access Control | Media access control | munication coverage for a coverage area 207 corresponding to the base station 201. A coverage area 207 corresponding to an access point may be divided into a plurality of sectors, and one sector corresponds to a part of the coverage area (not shown).

The network device 201 may also directly or indirectly communicate with the base station 201 through a backhaul link 211. The backhaul link 211 herein may be a wired or wireless communication connection.

The network device 201 may alternatively be a radio controller in a cloud radio access network (CRAN) scenario. The network device 201 may alternatively be a network device in a 5G network, a network device in a future evolved network, a wearable device, a vehicle-mounted device, or the like. The network device 201 may alternatively be a small cell, a transmission reference point (TRP), or the like. Certainly, this application is not limited thereto.

In some illustrative examples of this application, the network device 201 may include a base transceiver station, a radio transceiver, a basic service set (BSS), an extended service set (ESS), a NodeB, an eNodeB, or the like. The wireless communications system 200 may include several different types of base stations 201, for example, a macro base station and a micro base station. The base station 201 may use different radio technologies, for example, a cell radio access technology or a WLAN radio access technology.

The terminals 203 may be distributed in the entire wireless communications system 200, and may be stationary or moving. The terminal may be deployed on land, including an indoor terminal, an outdoor terminal, a handheld terminal, a wearable terminal, or a vehicle-mounted terminal; or may be deployed on a water surface (e.g., on a ship); or may be deployed in the air (e.g., on a plane, a balloon, or a satellite). The terminal device may be a mobile phone, a tablet computer (Pad), a computer having a wireless transceiver function, a virtual reality (VR) terminal device, an augmented reality (AR) terminal device, a wireless terminal in industrial control, a wireless terminal in self-driving, a wireless terminal in telemedicine, a wireless terminal in a smart grid, a wireless terminal in transportation safety, a wireless terminal in a smart city, a wireless terminal in a smart home, or the like. An application scenario is not limited in the illustrative examples of this application. The terminal device may sometimes be referred to as user equipment (UE), an access terminal device, a UE unit, a UE station, a mobile station, a mobile console, a remote station, a remote terminal device, a mobile device, a UE terminal device, a terminal device, a wireless communications device, a UE agent, a UE apparatus, or the like. In some illustrative examples of this application, the terminal 203 may include a mobile device, a mobile station, a mobile unit (mobile unit), a radio unit, a remote unit, a user agent, a mobile client, or the like.

In the illustrative examples of this application, the wireless communications system 200 may be an LTE communications system, for example, an LTE-U communications system, capable of operating in an unlicensed band, or may be a 5G communications system, a future new radio communications system, or the like capable of operating in an unlicensed band. The wireless communications system 200 may use a licensed-assisted access (LAA) solution to process terminal access in the unlicensed band. In the LAA solution, a primary cell is deployed in a licensed band to transfer key messages and services that requires quality of service assurance, and a secondary cell is deployed in an unlicensed band to improve a data plane performance.

In the illustrative examples of this application, the wireless communications system 200 can support multi-carrier (waveform signals at different frequencies) operations. A multi-carrier transmitter can simultaneously transmit modulated signals on a plurality of carriers. For example, each communication connection 205 can carry a multi-carrier signal modulated by using different radio technologies. Each modulated signal may be sent on a different carrier, or may carry control information (e.g., a reference signal or a control channel), overhead information (Overhead Information), data, and the like.

In addition, the wireless communications system 200 may further include a Wi-Fi network. To ensure that both an operator network and a Wi-Fi network (operating on an unlicensed spectrum) can function, the wireless communications system 200 may use a listen before talk (LBT) mechanism. For example, in the wireless communications system 200, some terminals 203 may be connected to a Wi-Fi access point 209 through Wi-Fi communication connections 217, to use unlicensed spectrum resources, and some terminals 203 may be connected to the base station 201 through mobile communication connections 205, to use unlicensed spectrum resources. Before using an unlicensed band, any device needs to listen first, to detect whether the band is occupied, and can occupy the band to perform data transmission only if the band is idle.

Figure 3:
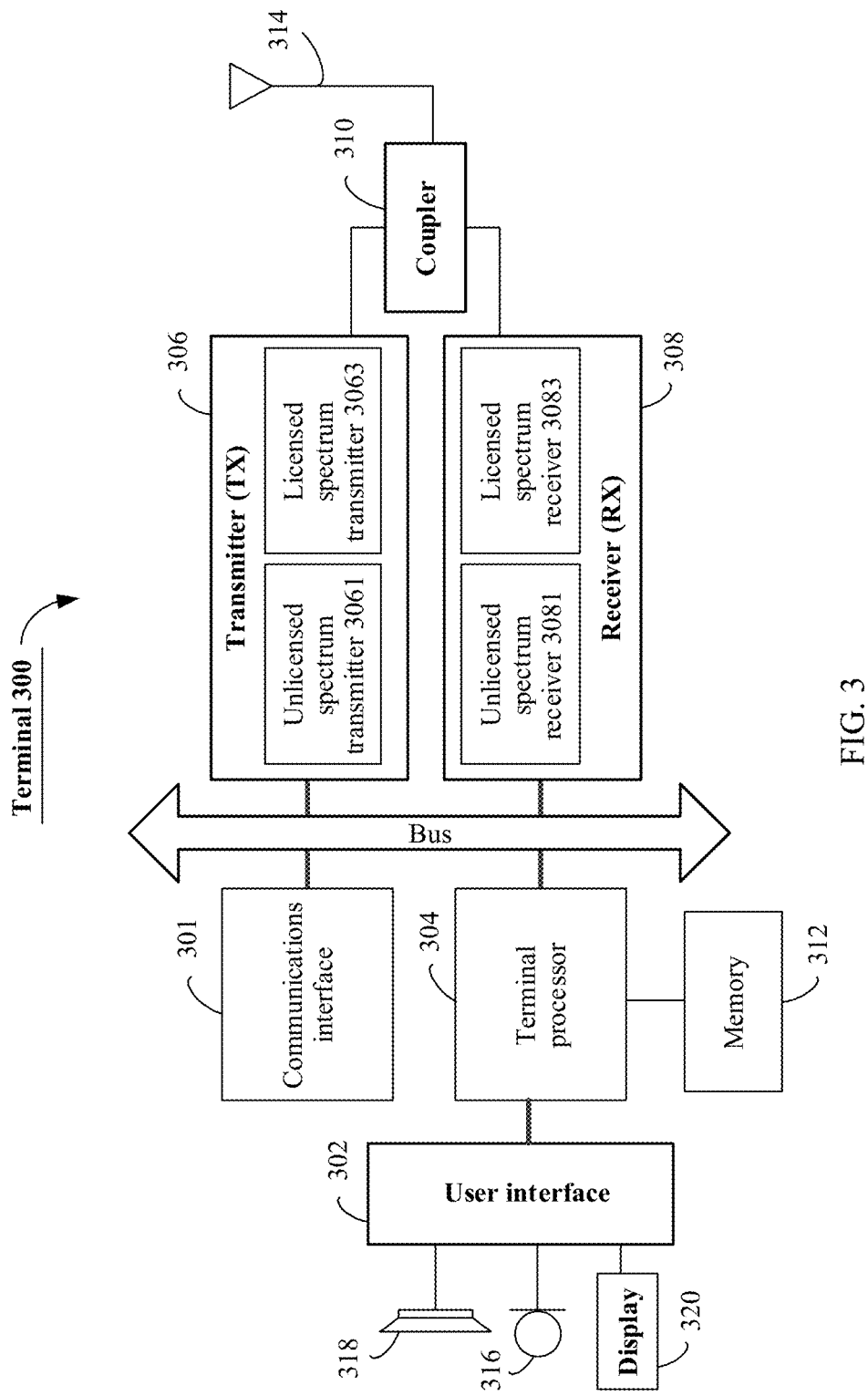
FIG. 3 is a schematic diagram of a hardware architecture of a terminal according to an illustrative example of this application.

FIG. 3 shows a terminal 300 according to some illustrative examples of this application. As shown in FIG. 3, the terminal 300 may include input/output modules (including an audio input/output module 318, a key input module 316, a display 320, and the like), a user interface 302, one or more terminal processors 304, a transmitter 306, a receiver 308, a coupler 310, an antenna 314, and a memory 312. These components may be connected by using a bus or in another manner. In FIG. 3, an example in which a bus is used for connection is used.

The communications interface 301 may be used by the terminal 300 to communicate with another communications device, for example, a base station. Specifically, the base station may be a base station 400 shown in FIG. 4. Specifically, the communications interface 301 may include one or more of a global system for mobile communications (Global System for Mobile Communications, GSM) (2G) communications interface, a wideband code division multiple access (WCDMA) (3G) communications interface, a long term evolution (LTE) (4G) communications interface, or the like, or may be a 4.5G, 5G, or future new radio communications interface. In addition to a wireless communications interface, a wired communications interface 301, for example, a local area network (LAN) interface may be further configured on the terminal 300.

The antenna 314 may be configured to convert electromagnetic energy in a transmission line into an electromagnetic wave in free space, or convert an electromagnetic wave in free space into electromagnetic energy in a transmission line. The coupler 310 is configured to: divide a mobile communication signal received by the antenna 314 into a plurality of signals, and allocate the signals to a plurality of receivers 308.

The transmitter 306 may be configured to transmit a signal output by the terminal processor 304, for example, modulate the signal in a licensed band or an unlicensed band. In some illustrative examples of this application, the transmitter 306 may include an unlicensed spectrum transmitter 3061 and a licensed spectrum transmitter 3063. The unlicensed spectrum transmitter 3061 may support the terminal 300 in transmitting signals on one or more unlicensed spectrums, and the licensed spectrum transmitter 3063 may support the terminal 300 in transmitting signals on one or more licensed spectrums.

The receiver 308 may be configured to receive a mobile communication signal received by the antenna 314. For example, the receiver 308 may demodulate a received signal that has been modulated in an unlicensed band or a licensed band. In some illustrative examples of this application, the receiver 308 may include an unlicensed spectrum receiver 3081 and a licensed spectrum receiver 3083. The unlicensed spectrum receiver 3081 may support the terminal 300 in receiving a signal that is modulated on an unlicensed spectrum, and the licensed spectrum receiver 3083 may support the terminal 300 in receiving a signal that is modulated on a licensed spectrum.

In some illustrative examples of this application, the transmitter 306 and the receiver 308 may be considered as a wireless modem. In the terminal 300, there may be one or more transmitters 306 and one or more receivers 308.

In addition to the transmitter 306 and the receiver 308 shown in FIG. 3, the terminal 300 may further include other communications components, for example, a GPS module, a Bluetooth module, and a wireless fidelity (Wi-Fi) module. In addition to the foregoing wireless communication signal, the terminal 300 may further support another wireless communication signal, for example, a satellite signal or a short-wave signal. In addition to wireless communication, a wired network interface (e.g., a LAN interface) may be further configured on the terminal 300 to support wired communication.

The input/output modules may be configured to implement interaction between the terminal 300 and a user or an external environment, and may mainly include the audio input/output module 318, the key input module 316, the display 320, and the like. Specifically, the input/output modules may further include a camera, a touchscreen, a sensor, and the like. The input/output modules all communicate with the terminal processor 304 through the user interface 302.

The memory 312 is coupled to the terminal processor 304, and is configured to store various software programs and/or a plurality of sets of instructions. Specifically, the memory 312 may include a high-speed random access memory, and may also include a non-volatile memory, for example, one or more magnetic disk storage devices, flash memory devices, or other non-volatile solid-state storage devices. The memory 312 may store an operating system (referred to as a system for short below), for example, an embedded operating system such as Android, iOS, Windows, or Linux. The memory 312 may further store a network communications program. The network communications program may be configured to communicate with one or more additional devices, one or more terminal devices, and one or more network devices. The memory 312 may further store a user interface program. The user interface program may use a graphical operation interface to intuitively display content of an application program, and use input controls such as a menu, a dialog box, and a key to receive a control operation performed by a user on the application program.

In some illustrative examples of this application, the memory 312 may be configured to store a program for implementing, on a terminal 300 side, a resource allocation method provided in one or more illustrative examples of this application. For implementation of the resource allocation method provided in the one or more illustrative examples of this application, refer to subsequent illustrative examples.

The terminal processor 304 may be configured to read and execute computer-readable instructions. Specifically, the terminal processor 304 may be configured to: invoke the program stored in the memory 312, for example, the program for implementing, on the terminal 300 side, the resource allocation method provided in the one or more illustrative examples of this application, and execute instructions included in the program.

It may be understood that the terminal 300 may be the terminal 203 in the wireless communications system 200 shown in FIG. 2, and may be implemented as a mobile device, a mobile station, a mobile unit, a radio unit, a remote unit, a user agent, a mobile client, or the like.

It should be noted that the terminal 300 shown in FIG. 3 is merely an implementation of the illustrative examples of this application. During actual application, the terminal 300 may alternatively include more or fewer components. This is not limited herein.

Figure 4:
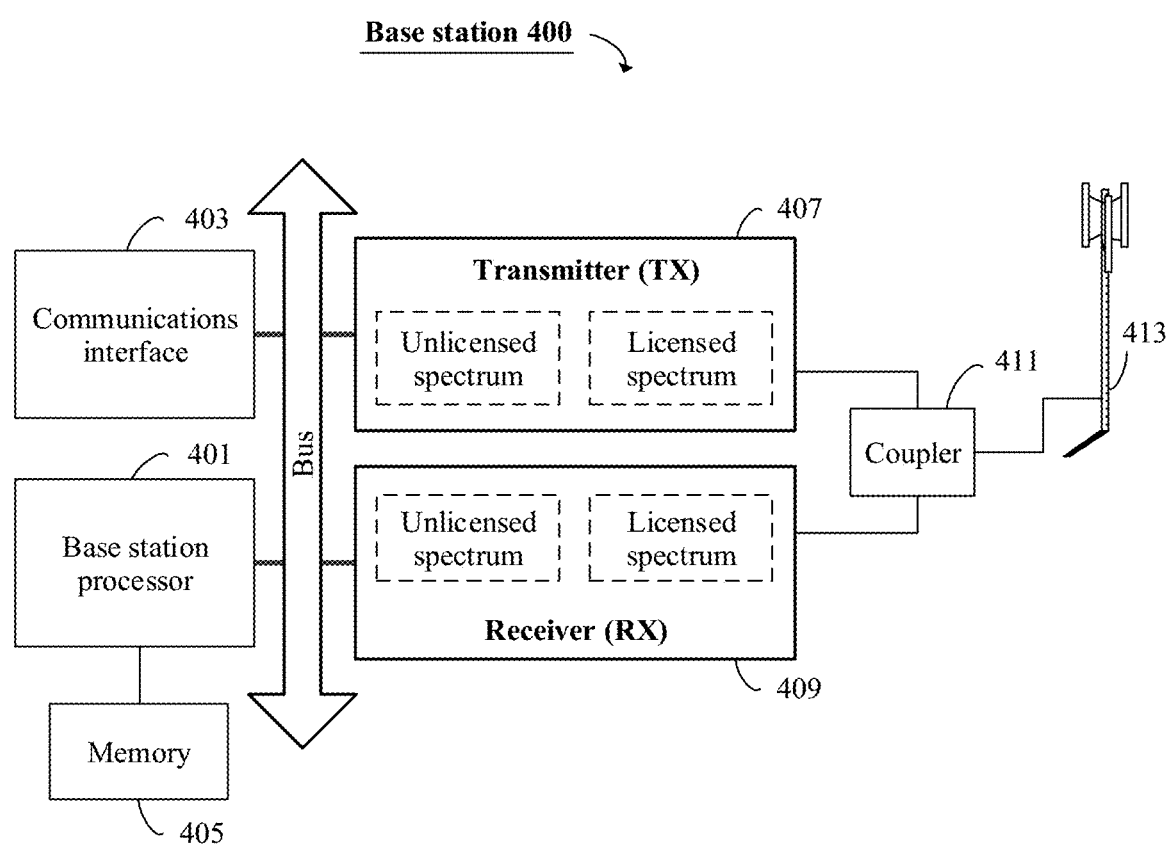
FIG. 4 is a schematic diagram of a hardware architecture of a base station according to an illustrative example of this application.

FIG. 4 shows a base station 400 according to some illustrative examples of this application. As shown in FIG. 4, the base station 400 may include a communications interface 403, one or more base station processors 401, a transmitter 407, a receiver 409, a coupler 411, an antenna 413, and a memory 405. These components may be connected by using a bus or in another manner. In FIG. 4, an example in which a bus is used for connection is used.

The communications interface 403 may be used by the base station 400 to communicate with another communications device, for example, a terminal device or another base station. Specifically, the terminal device may be the terminal 300 shown in FIG. 3. Specifically, the communications interface 403 may include one or more of a global system for mobile communications (GSM) (2G) communications interface, a wideband code division multiple access (WCDMA) (3G) communications interface, a long term evolution (LTE) (4G) communications interface, or the like, or may be a 4.5G, 5G, or future new radio communications interface. In addition to a wireless communications interface, a wired communications interface 403 may be further configured on the base station 400 to support wired communication. For example, a backhaul link between one base station 400 and another base station 400 may be a wired communication connection.

The antenna 413 may be configured to convert electromagnetic energy in a transmission line into an electromagnetic wave in free space, or convert an electromagnetic wave in free space into electromagnetic energy in a transmission line. The coupler 411 may be configured to: divide a mobile communication signal into a plurality of signals, and allocate the plurality of signals to a plurality of receivers 409.

The transmitter 407 may be configured to transmit a signal output by the base station processor 401, for example, modulate the signal in a licensed band or an unlicensed band. In some illustrative examples of this application, the transmitter 407 may include an unlicensed spectrum transmitter 4071 and a licensed spectrum transmitter 4073. The unlicensed spectrum transmitter 4071 may support the base station 400 in transmitting signals on one or more unlicensed spectrums, and the licensed spectrum transmitter 4073 may support the base station 400 in transmitting signals on one or more licensed spectrums.

The receiver 409 may be configured to receive a mobile communication signal received by the antenna 413. For example, the receiver 409 may demodulate a received signal that has been modulated in an unlicensed band or a licensed band. In some illustrative examples of this application, the receiver 409 may include an unlicensed spectrum receiver 4091 and a licensed spectrum receiver 4093. The unlicensed spectrum receiver 4091 may support the base station 400 in receiving a signal that is modulated on an unlicensed spectrum, and the licensed spectrum receiver 4093 may support the base station 400 in receiving a signal that is modulated on a licensed spectrum.

In some illustrative examples of this application, the transmitter 407 and the receiver 409 may be considered as a wireless modem. In the base station 400, there may be one or more transmitters 407 and one or more receivers 409.

The memory 405 is coupled to the base station processor 401, and is configured to store various software programs and/or a plurality of sets of instructions. Specifically, the memory 405 may include a high-speed random access memory, and may also include a non-volatile memory, for example, one or more magnetic disk storage devices, flash memory devices, or other non-volatile solid-state storage devices. The memory 405 may store an operating system (referred to as a system for short below), for example, an embedded operating system such as uCOS, VxWorks, or RTLinux. The memory 405 may further store a network communications program. The network communications program may be configured to communicate with one or more additional devices, one or more terminal devices, and one or more network devices.

The base station processor 401 may be configured to: manage a radio channel, make a call, establish or release a communications link, control cross-region handover of user equipment in a local control region, and so on. Specifically, the base station processor 401 may include: an administration module/communication module (AM/CM) (a center for speech channel switching and information exchange), a basic module (BM) (configured to implement call processing, signaling processing, radio resource management, radio link management, and circuit maintenance functions), a transcoder and submultiplexer (TCSM) (configured to implement multiplexing/demultiplexing and transcoding functions), and the like.

In the illustrative examples of this application, the base station processor 401 may be configured to read and execute computer-readable instructions. Specifically, the base station processor 401 may be configured to: invoke a program stored in the memory 405, for example, a program for implementing, on a base station 400 side, a resource allocation method provided in one or more illustrative examples of this application, and execute instructions included in the program.

It may be understood that the base station 400 may be the base station 201 in the wireless communications system 200 shown in FIG. 2, and may be implemented as a base transceiver station, a wireless transceiver, a basic service set (BSS), an extended service set (ESS), a NodeB, an eNodeB, or the like. The base station 400 may be implemented as several different types of base stations, for example, a macro base station and a micro base station. The base station 400 may use different radio technologies, for example, a cell radio access technology or a WLAN radio access technology.

It should be noted that the base station 400 shown in FIG. 4 is merely an implementation of the illustrative examples of this application. During actual application, the base station 400 may alternatively include more or fewer components. This is not limited herein.

The present disclosure may be applied to the foregoing 5G NR system, and the present disclosure may also be applied to another communications system. One entity in the communications system preconfigures or sends guard band indication information, and another entity presets a value or receives the indication information, and determines an available transmission bandwidth in a wideband based on the indication information.

Figure 5:
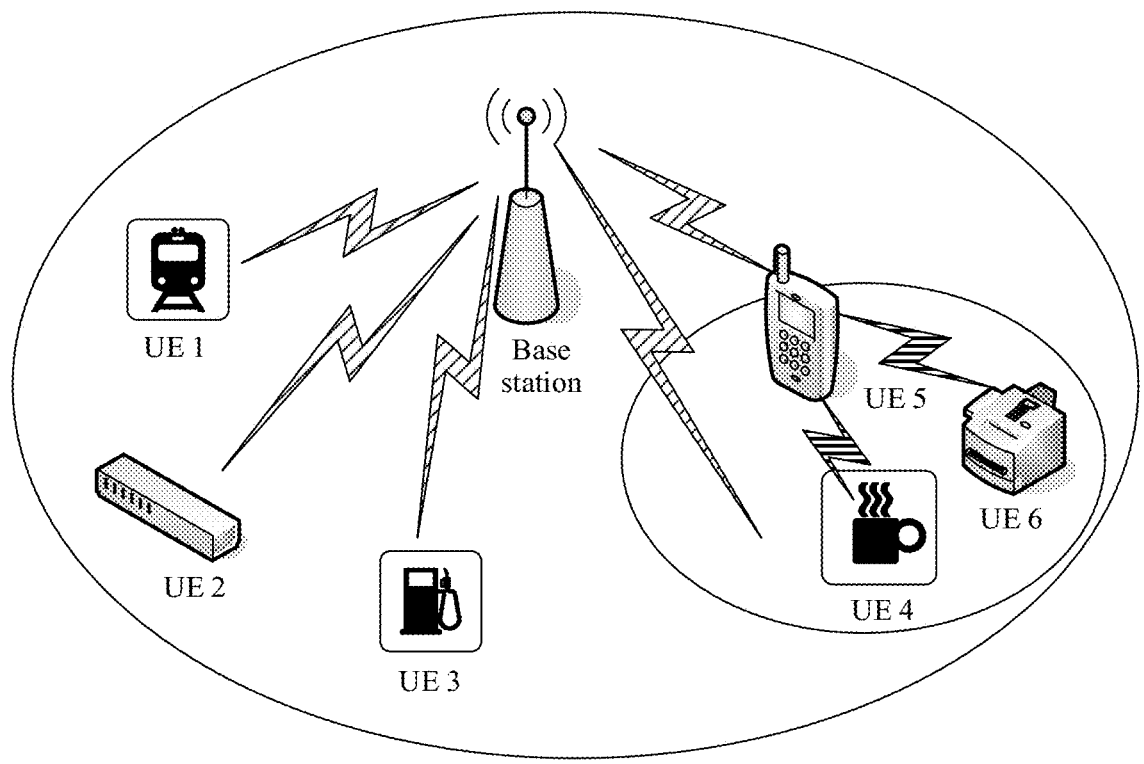
FIG. 5 is a schematic architectural diagram of a wireless communications system according to an illustrative example of this application.

As shown in FIG. 5, a communications system includes a base station and UE 1 to UE 6. In the communications system, the UE 1 to the UE 6 may send uplink data to the base station, and the base station needs to receive the uplink data sent by the UE 1 to the UE 6. In addition, a communications system may alternatively include the UE 4 to the UE 6. In the communications system, the BS may send downlink information to the UE 1, the UE 2, the UE 5, and the like. The UE 5 may also send downlink information to the UE 4 and the UE 6.

In an implementation of the present disclosure, a guard band indication method is provided. The base station indicates guard band configurations in different bandwidth scenarios by using radio resource control RRC signaling. For a wideband carrier/channel/BWP, different LBT results correspond to different available bandwidth scenarios, and different guard bands are configured for the different available bandwidth scenarios respectively. It may be understood that an available bandwidth and an unavailable bandwidth are relative concepts, and a guard band may alternatively be configured based on an unavailable bandwidth. Configuration of a guard band based on an available bandwidth may be equivalent to configuration of a guard band based on an unavailable bandwidth. The base station indicates different guard band configuration information to the UE by using the RRC signaling. Based on the guard band configuration information, the UE may learn of information about a bandwidth or a resource that is actually used for transmission in the different available bandwidth scenarios. It may be understood that, in various implementations, solutions of a guard band indication in a wideband carrier, a channel, or a BWP are similar. For ease of description, only the BWP is used as an example below. However, related illustrative examples are also applicable to a guard band indication in a wideband channel and a guard band indication in a wideband carrier, and no limitation is constituted.

In a possible implementation solution, the guard band indication is preset in a system, and the base station may notify the UE of guard band information by using a system message and/or radio resource control signaling. In addition, the base station further indicates, in the system message, bandwidth information configured for the UE (which is referred to as bandwidth configuration information for short below). Specifically, BWP information is used as an example. Optionally, the BWP information includes uplink BWP information and downlink BWP information, and the UE may learn of corresponding uplink and downlink bandwidth configuration information based on the BWP information. For an unlicensed band, because LBT needs to be performed, and for a BWP, a bandwidth that can be actually used for transmission (which is referred to as an available bandwidth for short below) depends on an LBT result, the base station needs to indicate corresponding guard bands in all possible available bandwidth cases caused by uncertainty of the LBT result. The UE may learn of corresponding guard band information in all possible available bandwidth scenarios based on corresponding guard band indication information. In some implementations, the available bandwidth corresponds to a part of bandwidth on which the LBT succeeds, and the unavailable bandwidth corresponds to a part of bandwidth on which the LBT fails. In some other implementations, the available bandwidth may be less than a part of bandwidth on which the LBT succeeds.

Before data transmission is performed, LBT needs to be performed. It may be understood that due to uncertainty of an LBT result, an available bandwidth may be less than or equal to a configured bandwidth. In this case, a sending device needs to notify a receiving device of the available bandwidth. For the receiving device, the receiving device can learn, based on the bandwidth configuration information and available bandwidth information that are indicated and the guard band indication information, of a resource position corresponding to a corresponding guard band in a current available bandwidth scenario, to finally learn of resources on which data needs to be received.

Figure 6:
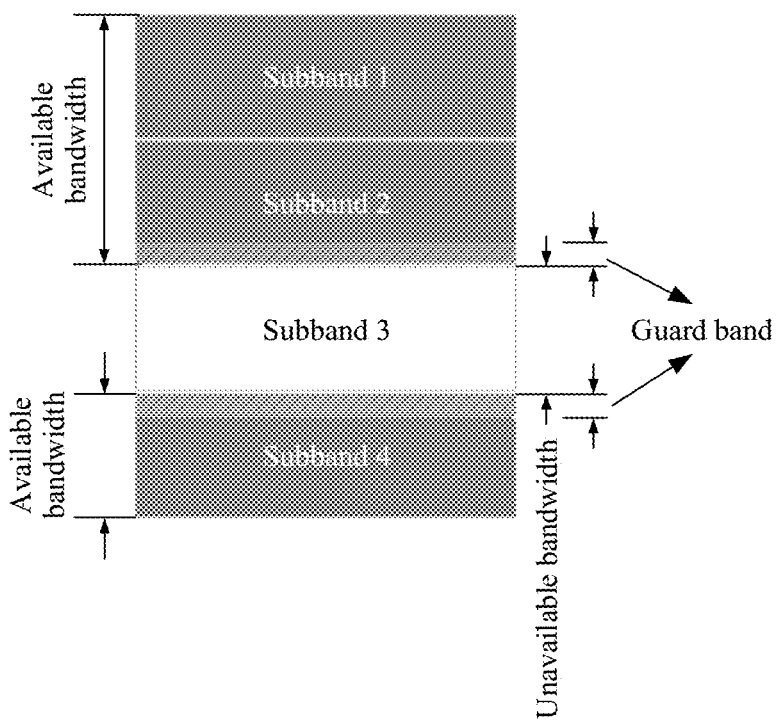
FIG. 6 is a simple schematic diagram of a position of a guard band according to this application.

Specifically, downlink transmission is used as an example. Assuming that a downlink BWP configured by the base station is 80 MHz, the base station needs to indicate, by using a system message or RRC signaling, guard band information corresponding to all possible available bandwidth scenarios. For example, assuming that an LBT basic bandwidth is 20 MHz, that is, LBT is performed on four 20 MHz subbands, based on different LBT results, an available bandwidth of the 80 MHz BWP has the following possible combinations: a subband 1, a subband 2, a subband 3, a subband 4, subbands 1+2, subbands 1+3, subbands 1+4, subbands 2+3, subbands 2+4, subbands 3+4, subbands 1+2+3, subbands 1+2+4, subbands 1+3+4, subbands 2+3+4, or subbands 1+2+3+4. (As shown in FIG. 6, the available bandwidth is the subbands 1+2+4, and an unavailable bandwidth is the subband 3. A guard band may be indicated based on the available bandwidth, or optionally, may be indicated based on the unavailable bandwidth. Specifically, if the indication is performed based on the available bandwidth, a size of a resource actually used for transmission is less than or equal to a size of a resource corresponding to the available bandwidth minus a size of a resource corresponding to the guard band. If the indication is performed based on the unavailable bandwidth, a size of a resource that is actually not used for transmission should be greater than or equal to a size of a resource corresponding to the unavailable bandwidth plus a size of a resource corresponding to the guard band. Optionally, in a subsequent specific implementation solution, the two manners may be equivalent to each other.) In this case, the base station needs to indicate guard band information corresponding to all the foregoing possible combinations in a system message/RRC signaling. It may be understood that, for sending of the system message or the RRC signaling in an unlicensed band, LBT also needs to be performed first, and the base station can send the foregoing message only after the LBT succeeds.

It can be learned that, in an implementation of the present disclosure, one or any combination of the following four types of indications is included: an indication of bandwidth configuration information, an indication of available bandwidth information, an indication of unavailable bandwidth information, or an indication of guard band information.

Implementation of the Indication of the Bandwidth Configuration Information

The base station may indicate the bandwidth configuration information by using a system message/RRC. Specifically, the bandwidth configuration information includes position information, a subcarrier spacing, and/or the like of a configured bandwidth. Referring to descriptions of a BWP in 3GPP 38.331, for example, a definition of a BWP information element, the position information of the configured bandwidth may directly define one or more of a subcarrier spacing, a start RB, and an end RB that correspond to the configured bandwidth, a quantity of RBs corresponding to the configured bandwidth, or the like, and the UE may learn of an actual frequency domain position of the configured bandwidth based on the indication information, for example, based on the subcarrier spacing, the start RB, and the corresponding total quantity of RBs. Further, optionally, the bandwidth configuration information may further include subband information corresponding to the BWP. For example, the bandwidth configuration information further includes a quantity of subbands obtained by dividing the BWP, for example, NrofSubband, and a frequency domain position corresponding to each subband. Frequency domain position information of the subband may be absolute frequency domain position information, or may be indicated by using a start RB and/or a quantity of RBs. To be specific, the UE may learn, based on a start RB corresponding to the subband and a quantity of RBs included in the subband, of the frequency domain position corresponding to the subband. Optionally, the frequency domain position may alternatively be indicated by using a start RB and/or an end RB.

In addition, in a possible manner, the bandwidth configuration information includes information about a plurality of configured bandwidths, and the information about the plurality of configured bandwidths may be carried in a same piece of indication information or in a plurality of pieces of indication information. That is, for same UE, the base station may configure a plurality of pieces of different bandwidth configuration information for the UE, and information corresponding to each configured bandwidth may be implemented in any one of the foregoing manners.

Figure 7:
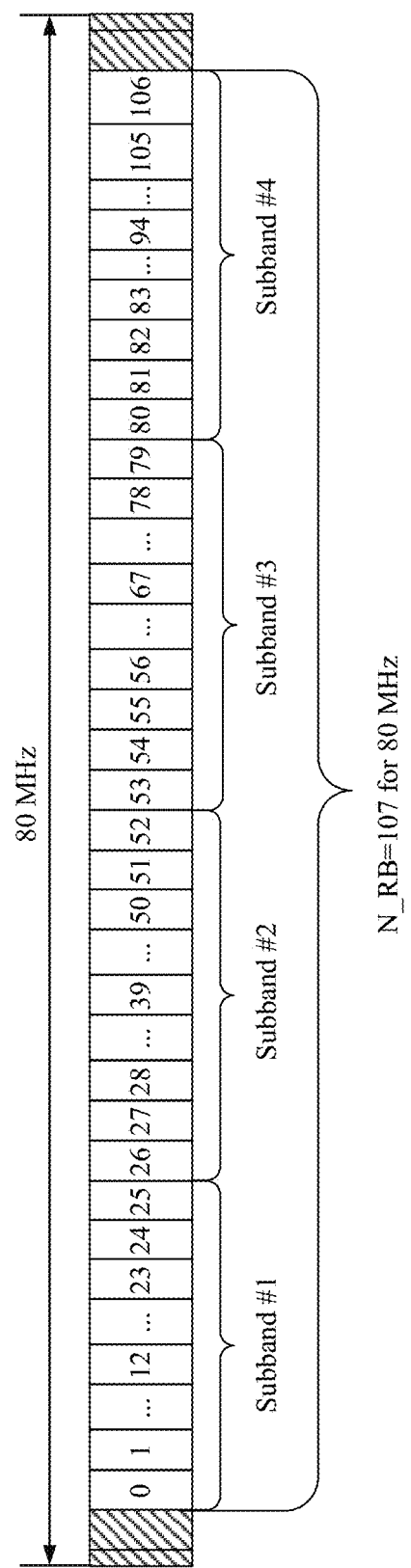
FIG. 7 to FIG. 12 each are a schematic diagram of an 80 MHz bandwidth resource according to an illustrative example of this application.

The following further provides descriptions by using an example. As shown in FIG. 7, it is assumed that the base station configures an 80 MHz downlink BWP for UE, and a subcarrier spacing is 60 kHz. The base station may indicate, by using bandwidth configuration information, that the subcarrier spacing of the 80 MHz BWP is 60 kHz, and frequency domain positions are an RB #0 to an RB #106, namely, 107 RBs in total. Specifically, the base station may indicate a start RB #0 (the first RB) and a quantity of RBs, namely, 107. Alternatively, the base station may indicate that a start RB is the RB #0 (the first RB) and an end RB is the RB #106 (the last RB). The UE may learn of a frequency domain position of the configured 80 MHz BWP based on the indication information. Further, the base station may further configure bandwidth information of a plurality of subbands in the 80 MHz BWP. For example, a quantity of included subbands being 4 is indicated; bandwidth information corresponding to a subband 1 being the start RB #0 and a quantity of RBs being 26 is further indicated; bandwidth information corresponding to a subband 2 being that a start RB is the RB #26 and a quantity of RBs is 27 is indicated; bandwidth information corresponding to a subband 3 being that a start RB is the RB #53 and a quantity of RBs is 27 is indicated; and bandwidth information corresponding to a subband 4 being that a start RB is the RB #80 and a quantity of RBs is 27 is indicated. Alternatively, bandwidth information corresponding to a subband 1 being that a start RB is the RB #0 and an end RB is the RB #25 is indicated; bandwidth information corresponding to a subband 2 being that a start RB is the RB #26 and an end RB is the RB #52 is indicated; bandwidth information corresponding to a subband 3 being that a start RB is the RB #53 and an end RB is the RB #79 is indicated; and bandwidth information corresponding to a subband 4 being that a start RB is the RB #80 and an end RB is the RB #106 is indicated. It should be noted that, the quantity of RBs and the subband division herein are merely used to describe the solution, and do not constitute a limitation. Alternatively, another solution may be used. For example, a quantity of RBs corresponding to 80 MHz is 108, each subband includes 27 RBs, and corresponding RBs may be arranged in ascending or descending order.

Figure 8:
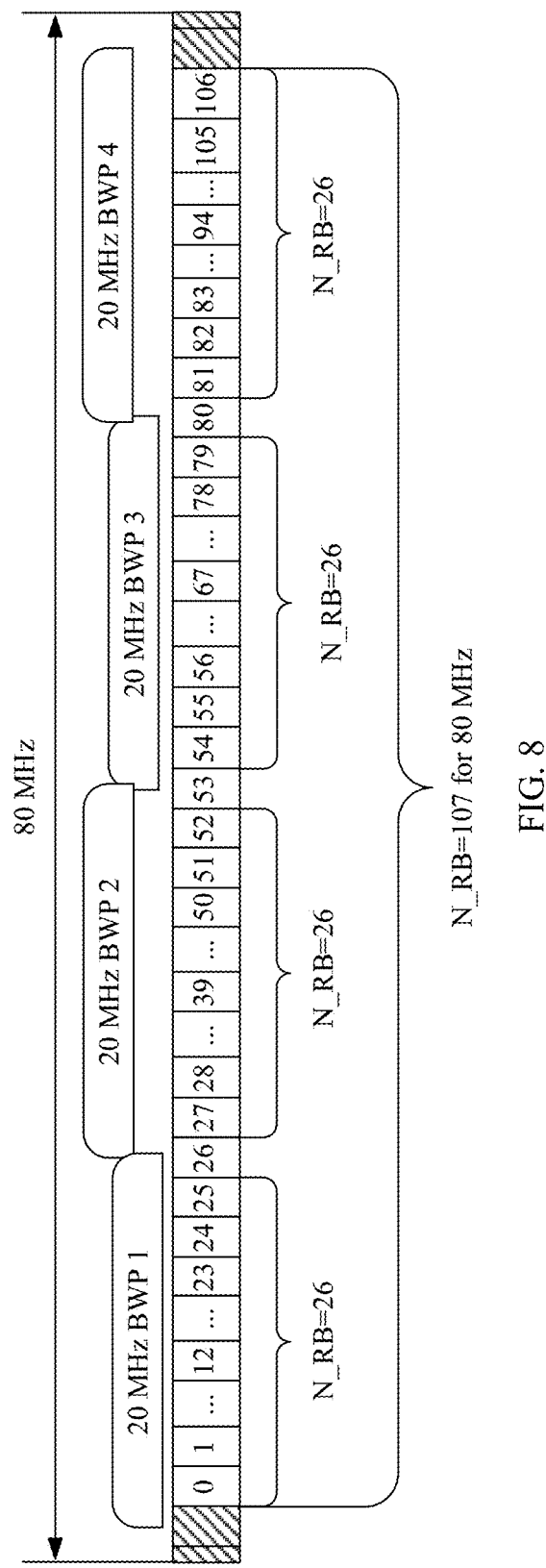

In addition, the base station may further configure a plurality of BWPs for the UE at the same time. Optionally, the base station may include information about the plurality of BWPs in one piece of bandwidth configuration information, or the base station sends a plurality of pieces of bandwidth configuration information, and each piece of bandwidth configuration information includes information about one BWP. For example, as shown in FIG. 8, when configuring an 80 MHz BWP for the UE, the base station further configures four 20 MHz BWPs. For the 80 MHz BWP, a start RB being an RB #0 and a quantity of RBs being 107 may be indicated; or a start RB being an RB #0 and an end RB being an RB #106 may be indicated. For a 20 MHz BWP 1, a start RB being an RB #0 and a quantity of RBs being 26 may be indicated; or a start RB being an RB #0 and an end RB being an RB #25 may be indicated. For a 20 MHz BWP 2, a start RB being an RB #27 and a quantity of RBs being 26 may be indicated; or a start RB being an RB #27 and an end RB being an RB #52 may be indicated. For a 20 MHz BWP 3, a start RB being an RB #54 and a quantity of RBs being 26 may be indicated; or a start RB being an RB #54 and an end RB being an RB #79 may be indicated. For a 20 MHz BWP 4, a start RB being an RB #81 and a quantity of RBs being 26 may be indicated; or a start RB being an RB #81 and an end RB being an RB #106 may be indicated. The information may be included in a same piece of bandwidth configuration information for indication. Alternatively, optionally, the information may be separately indicated in a plurality of pieces of bandwidth configuration information. It should also be noted that in a 60 kHz subcarrier spacing scenario, a bandwidth size of the BWP is not limited herein, and may alternatively be another value, for example, 40 MHz, 60 MHz, or 100 MHz. The quantity of RBs corresponding to the 80 MHz BWP and the quantity of RBs corresponding to each narrowband 20 MHz BWP are merely used to describe the solution, and do not constitute a limitation. Alternatively, the quantity of RBs corresponding to the 80 MHz BWP and the quantity of RBs corresponding to each narrowband 20 MHz BWP may be other values. For example, each 20 MHz BWP corresponds to 24 RBs, as shown in FIG. 8. Another corresponding solution may alternatively be used for the quantity of RBs corresponding to each BWP.

Certainly, in another implementation, the bandwidth configuration information may be implicitly indicated. For example, in some implementation solutions, the bandwidth configuration information may be an initial access bandwidth by default, for example, an initial active BWP.

After receiving the indication of the bandwidth configuration information, the UE may learn, based on an LBT result and with reference to the indication of the available bandwidth or the indication of the guard band information, of a range of an actual resource position corresponding to downlink transmission, to complete data receiving within the available bandwidth in the bandwidth and beyond the guard band. Specifically, data receiving is completed on an allocated resource, which is not involved in the implementations of the present disclosure, and details are not described.

Implementation of the Indication of the Available Bandwidth Information/the Indication of the Unavailable Bandwidth Information Downlink transmission is used as an example, and a solution used during uplink transmission may be deduced by analogy. Details are not described herein. When there is downlink data transmission, the base station first performs LBT, and then performs data transmission on an available bandwidth on which the LBT succeeds. The base station may indicate available bandwidth information, so that the UE can correctly receive data.

In a possible manner, the available bandwidth information is directly indicated in downlink control information DCI. For example, the case described in FIG. 5 is used as an example, and the available bandwidth is the subband 1, the subband 2, and the subband 4. In this case, the base station indicates information about the subbands 1, 2, and 4 in the DCI. Alternatively, the available bandwidth information is indicated in the DCI by using a bitmap. For example, for four subbands, a 4-bit bitmap is used. Each bit corresponds to one subband. When a value of the bit is "1", it indicates that the subband corresponding to the bit is available. For example, when the available bandwidth is the subband 1, the subband 2, and the subband 4, "1101" may be used for indication.

In another example, optionally, the available bandwidth may be indicated with reference to RRC signaling. For example, the base station pre-numbers and pre-indexes all possible available bandwidth combinations by using the RRC signaling. For example, if an index of the available bandwidth is identified by using AvailableBW_ID, all the available bandwidth combinations may be indicated by using one or more of the following configuration information:

AvailableBWConfig::=Sequence(size(1 . . . MaxNrofAvailableBW) of AvailableBW)
AvailableBW::=sequence{
AvailableBW_ID//indicating an index ID of an available bandwidth
Subcarrierspacing//indicating a subcarrier spacing corresponding to the available bandwidth corresponding to the ID
BandwidthInfo//indicating available bandwidth information corresponding to the ID}

MaxNrofAvailableBW indicates a maximum quantity of all available bandwidth combinations that is supported.

It is not difficult to understand that the foregoing indication manner corresponds to a list-type indication manner, that is, each ID of an available bandwidth corresponds to one piece of detailed bandwidth information. An example in which four subbands are obtained through division based on an 80 MHz BWP and a 60 kHz subcarrier spacing is also used. In this case, corresponding MaxNrofAvailableBW=15. Assuming that BandwidthInfo corresponding to AvailableBW_ID=1 is a subband 1, it indicates that an available bandwidth with the ID being 1 corresponds to the subband 1. Optionally, the base station may also directly indicate, in BandwidthInfo, detailed resource information of an available bandwidth corresponding to an ID of a current available bandwidth, for example, perform indication by using one or more of a start resource position, an end resource position, a quantity of resources, an absolute resource position, a resource index, and the like. The resource may be an RB/a subcarrier/a subcarrier set, or the like. In this case, even if the UE does not learn of information about a subband from the bandwidth configuration information, the UE can still accurately obtain resource information corresponding to each available bandwidth. It should be noted that the foregoing format is merely used to describe the solution, and does not constitute a limitation. All list-type indication manners fall within the scope of the present disclosure.

Figure 9:
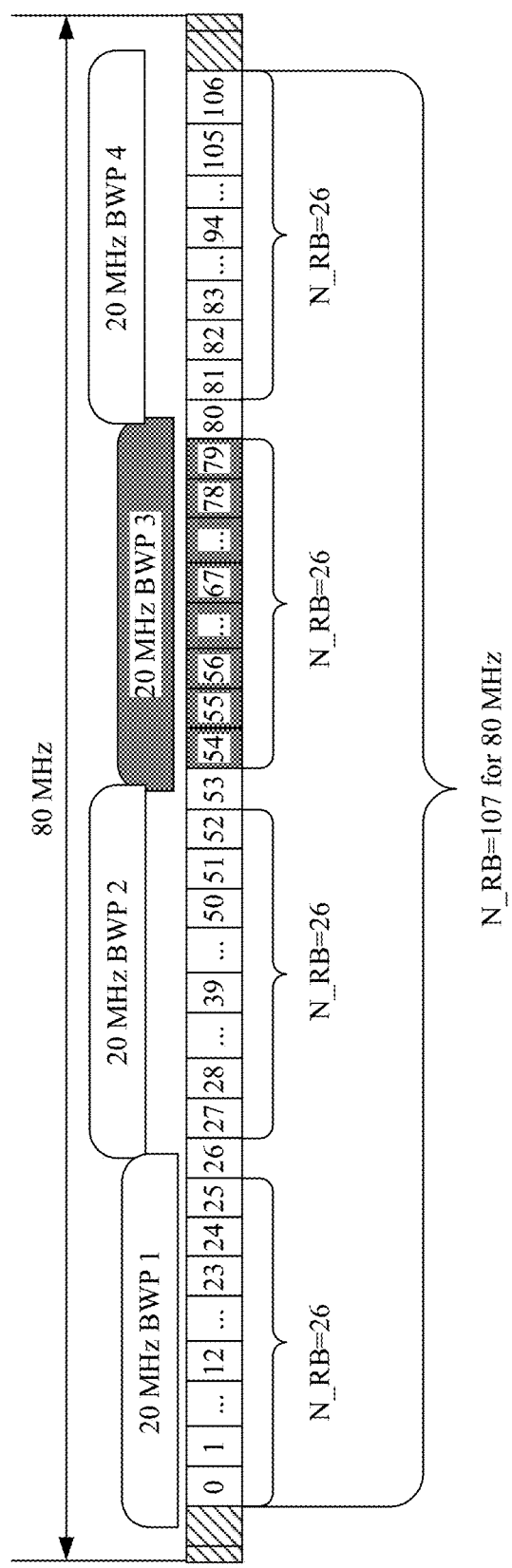

It may be understood that, in the foregoing solution, indication is performed based on a subband. When the base station configures a plurality of narrowband BWPs at the same time, in a similar solution, indication may also be performed based on a narrowband BWP. For example, a case described in FIG. 9 is used as an example, and a corresponding available bandwidth is a 20 MHz BWP 1, a 20 MHz BWP 2, and a 20 MHz BWP 4. In this case, the base station indicates information about the BWPs 1, 2, and 4 in DCI. Alternatively, optionally, information about the available bandwidth is indicated in DCI by using a bitmap bitmap. For example, for four 20 MHz BWPs, a 4-bit bitmap is used, and each bit corresponds to one 20 MHz BWP. When a value of the bit is "1", it indicates that a BWP corresponding to the bit is available. For example, when the available bandwidth is the 20 MHz BWP 1, the 20 MHz BWP 2, and the 20 MHz BWP 4, "1101" may be used for indication. In addition, optionally, the available bandwidth needs to be indicated with reference to RRC signaling. For example, the base station pre-numbers and pre-indexes all possible available bandwidth combinations by using the RRC signaling. A specific solution is the same as the foregoing solution.

It should be noted that, for a configuration of a narrowband BWP, in some implementations, resources corresponding to a plurality of adjacent narrowband BWPs may be noncontiguous. As shown in FIG. 9, RBs corresponding to the BWP 1 are an RB #0 to an RB #25, RBs corresponding to the BWP 2 are an RB #27 to an RB #52, and there is an RB between the BWP 1 and the BWP 2. In another implementation solution, a quantity of RBs between adjacent BWPs may be another value. In this case, to indicate the available bandwidth, there are the following possible implementations: Optionally, the available bandwidth is a union set of resources corresponding to a plurality of indicated available BWPs. For example, when the base station indicates that the available bandwidth is the BWP 1, the BWP 2, and the BWP 4, resources corresponding to the available bandwidth are the RB #0 to the RB #25, the RB #27 to the RB #52, and an RB #81 to an RB #106. Optionally, information about an unavailable BWP may be learned of based on the indicated available BWP. In this case, the available bandwidth corresponds to a remaining resource obtained by subtracting a part of resources corresponding to the unavailable BWP from total resources. For example, when the base station indicates that the available bandwidth is the BWP 1, the BWP 2, and the BWP 4, the resources corresponding to the available bandwidth are all resources other than resources RB #54 to RB #79 corresponding to an unavailable BWP 3. Based on the foregoing RRC signaling, when indicating the available bandwidth, the base station may indicate, in DCI, an index ID corresponding to an actual transmission bandwidth, and the UE may learn of information about the corresponding available bandwidth based on the index ID and information indicated in the RRC signaling.

After obtaining the available bandwidth information in the foregoing manner (directly indicated by the DCI, or indicated by the RRC in combination with the DCI), the UE may learn of corresponding guard band information in a current available bandwidth scenario with reference to an indication of the guard band information or a guard band determining principle stipulated in a standard. With reference to the available bandwidth information and the guard band information, the UE may learn of a range of an actual resource position corresponding to downlink transmission, to complete data receiving within the available bandwidth in the bandwidth and beyond the guard band. (Specifically, data receiving is completed on an allocated resource, which is not involved in the implementations of the present invention, and details are not described.)

Implementation of the Indication of the Guard Band Information

In a possible manner, the base station explicitly indicate the guard band information in a system message or RRC signaling. For example, the explicit guard band information may be implemented by indicating a size of a guard band, for example, X RBs, subcarriers, or subcarrier sets. For another example, that a bandwidth occupied by the guard band is X Hz or X MHz is directly indicated. For another example, that the guard band is a percentage of a size of a bandwidth or a frequency domain unit may be indicated. In this solution, the UE may determine a resource position of the guard band based on the bandwidth configuration information and the available bandwidth information with reference to the size of the guard band. That is, the UE may determine the resource position of the guard band at one or more boundaries of the available bandwidth based on the foregoing received information.

Figure 10:
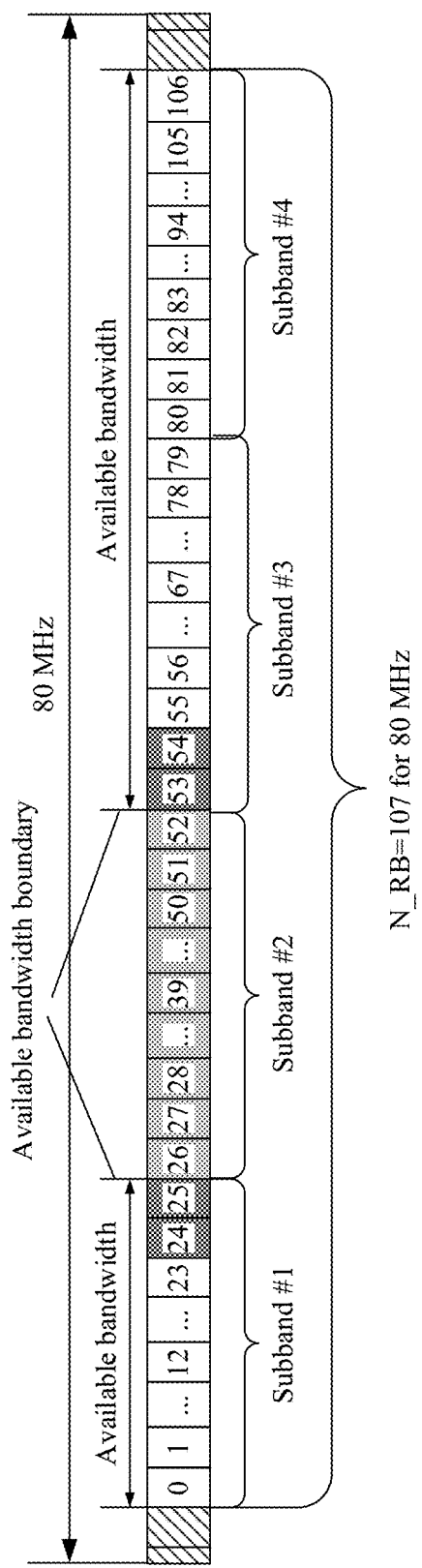

For example, referring to FIG. 10, an 80 MHz BWP and a 60 kHz subcarrier spacing are also used as an example. It is assumed that LBT is performed on four 20 MHz subbands, and an available bandwidth is subbands 1+3+4. Still using the foregoing assumption, based on bandwidth configuration information and an indication of the available bandwidth, it may be learned that resources corresponding to the available bandwidth are frequency domain resources corresponding to the subband 1, the subband 3, and the subband 4, that is, an RB #0 to an RB #25, and an RB #53 to an RB #106. In this case, for example, the base station may directly explicitly indicate that a size of a guard band is two RBs. After receiving the information, the UE may learn that two RBs (the RB #24 and the RB #25 at the first boundary, and the RB #53 and the RB #54 at the second boundary) located at each of two boundaries of the available bandwidth are a guard band. It may be understood that, when the guard band information includes only the size of the guard band, it is further determined, based on the available bandwidth, that a position of the guard band should be based on a default criterion or a criterion pre-stipulated in a standard. For example, it is stipulated that the guard band corresponds to X consecutive RBs, subcarriers, or subcarrier sets at one or more boundaries of the available bandwidth along a bandwidth decreasing direction, or in an ascending direction and/or a descending direction. It may be understood that another pre-stipulated rule may be used. This is not limited in the implementations of the present invention.

Alternatively, optionally, the explicit guard band information may be implemented by directly indicating a resource position corresponding to the guard band. In this case, the base station needs to indicate, for all possible available bandwidths, resource positions of guard bands corresponding to the possible available bandwidths. The resource position information may be based on start and end resource indexes, and/or a start resource and a quantity of resources, and/or a manner of directly indicating a resource index. The resource may be a resource block RB/subcarrier/subcarrier set, or the like.

For example, if an index of the available bandwidth is identified by using AvailableBW_ID, the guard bands corresponding to all the available bandwidths may be indicated by using one or more of the following configuration information:

GuardbandConfig::=Sequence(size(1 . . . MaxNrofAvailableBW) of Guardband)
Guardband::=sequence{
AvailableBW_ID//indicating an index ID of an available bandwidth
Subcarrierspacing//indicating a subcarrier spacing corresponding to the available bandwidth corresponding to the ID
GuardbandInfo//indicating guard band information corresponding to the available bandwidth corresponding to the ID}
MaxNrofAvailableBW//indicates a maximum quantity of all available bandwidth combinations that is supported.

Specifically, for example, the foregoing example is still used. Assuming that an available bandwidth corresponding to an available bandwidth AvailableBW_ID=13 is subbands 1+3+4, corresponding GuardbandInfo is the RB #24 and the RB #25, and the RB #53 and the RB #54.

Optionally, the guard band information may also be included in configuration information of the available bandwidth, for example, a column of information is added to the configuration information of the available bandwidth. For example, the guard band information is indicated by using one or more pieces of information included in the following configuration information:

AvailableBWConfig::=Sequence(size(1 . . . MaxNrofAvailableBW) of AvailableBW)
AvailableBW::=sequence{
AvailableBW_ID//indicating an index ID of an available bandwidth
BandwidthInfo//indicating available bandwidth information corresponding to the ID
Subcarrierspacing//indicating a subcarrier spacing corresponding to the available bandwidth corresponding to the ID
GuardbandInfo//indicating guard band information corresponding to the available bandwidth corresponding to the ID}
MaxNrofAvailableBW//indicates a maximum quantity of all available bandwidth combinations that is supported.

It is not difficult to understand that the foregoing configuration information corresponds to content included in Table 1 (values in Table 1 are merely used to describe the solution, and do not constitute a limitation).

In another possible implementation, the base station indirectly indicates, by using RRC signaling, the guard band information corresponding to the available bandwidth, and optionally, indicates information about a resource that can be actually used for transmission in various available bandwidth scenarios. It may be understood that the resource that can be actually used for transmission should be include total resources included in the available bandwidth minus a resource used for the guard band. For example, the guard band information is indicated by using one or more pieces of indications included in the following configuration information:

AvailableBWConfig::=Sequence(size(1 . . . MaxNrofAvailableBW) of AvailableBW)
AvailableBW::=sequence{
AvailableBW_ID//indicating an index ID of an available bandwidth
Subcarrierspacing//indicating a subcarrier spacing corresponding to the available bandwidth corresponding to the ID
BandwidthInfo//indicating available bandwidth information
ResourceInfo//indicating an actually available resource of the available bandwidth corresponding to the ID (implicitly indicating guard band information)}
MaxNrofAvailableBW//indicates a maximum quantity of all available bandwidth combinations that is supported.

It may be understood that ResourceInfo implicitly includes the guard band information.

Similarly, it is not difficult to understand that the foregoing configuration information corresponds to content included in Table 2 (values in Table 2 are merely used to describe the solution, and do not constitute a limitation).

TABLE 2

| Available bandwidth index (AvailableBW_ID) | Available bandwidth information (BandwidthInfo) | Subcarrier spacing Subcarrier-spacing | Available resource information (ResourceInfo) |
|---|---|---|---|
| 1 | Subband 1 | 60 kHz | RBs #0 to #23 |
| 2 | Subband 2 | 60 kHz | RBs #28 to #50 |
| 3 | Subband 3 | 60 kHz | RBs #55 to #76 |
| 4 | Subband 4 | 60 kHz | RBs #82 to #106 |

TABLE 1

| Available bandwidth index (AvailableBW_ID) | Available bandwidth information (BandwidthInfo) | Subcarrier spacing Subcarrier-spacing | Guard band information (GuardbandInfo) |
|---|---|---|---|
| 1 | Subband 1 | 60 kHz | RBs #24 and #25 |
| 2 | Subband 2 | 60 kHz | RBs #26, #27, #51, and #52 |
| 3 | Subband 3 | 60 kHz | RBs #53, #54, #78, and #79 |
| 4 | Subband 4 | 60 kHz | RBs #80 and #81 |
| 5 | Subbands 1 + 2 | 60 kHz | RBs #51 and #52 |
| 6 | Subbands 1 + 3 | 60 kHz | RBs #24, #25, #53, #54, #78, and #79 |
| 7 | Subbands 1 + 4 | 60 kHz | RBs #24, #25, #80, and #81 |
| 8 | Subbands 2 + 3 | 60 kHz | RBs #26, #27, #78, and #79 |
| 9 | Subbands 2 + 4 | 60 kHz | RBs #26, #27, #51, #52, #80, and #81 |
| 10 | Subbands 3 + 4 | 60 kHz | RBs #53 and #54 |
| 11 | Subbands 1 + 2 + 3 | 60 kHz | RBs #78 and #79 |
| 12 | Subbands 1 + 2 + 4 | 60 kHz | RBs #51, #52, #80, and #81 |
| 13 | Subbands 1 + 3 + 4 | 60 kHz | RBs #24, #25, RB #53, and #54 |
| 14 | Subbands 2 + 3 + 4 | 60 kHz | RBs #26 and #27 |
| 15 | Subbands 1 + 2 + 3 + 4 | 60 kHz | Null |

TABLE 2-continued

| Available bandwidth index (AvailableBW_ID) | Available bandwidth information (BandwidthInfo) | Subcarrier spacing Subcarrier-spacing | Available resource information (ResourceInfo) |
|---|---|---|---|
| 5 | Subbands 1 + 2 | 60 kHz | RBs #0 to #50 |
| 6 | Subbands 1 + 3 | 60 kHz | RBs #0 to #23, and RBs #55 to #76 |
| 7 | Subbands 1 + 4 | 60 kHz | RBs #0 to #23, and RBs #82 to #106 |
| 8 | Subbands 2 + 3 | 60 kHz | RBs #28 to #76 |
| 9 | Subbands 2 + 4 | 60 kHz | RBs #28 to #50, and RBs #82 to #106 |
| 10 | Subbands 3 + 4 | 60 kHz | RBs #55 to #106 |
| 11 | Subbands 1 + 2 + 3 | 60 kHz | RBs #0 to #76 |
| 12 | Subbands 1 + 2 + 4 | 60 kHz | RBs #0 to #50, and RBs #82 to #106 |
| 13 | Subbands 1 + 3 + 4 | 60 kHz | RBs #0 to #23, and RBs #55 to #106 |
| 14 | Subbands 2 + 3 + 4 | 60 kHz | RBs #28 to #106 |
| 15 | Subbands 1 + 2 + 3 + 4 | 60 kHz | RBs #0 to #106 |

In another example, optionally, the guard band information corresponding to the available bandwidth may be indirectly indicated by indicating information about a resource that cannot be used for transmission in various available bandwidth cases. It may be understood that the resource that cannot be used for transmission should be equal to a union set of total resources included in the unavailable bandwidth and a resource for the guard band.

For example, the guard band information is indicated by using one or more indications included in the following configuration information:

AvailableBWConfig::=Sequence(size(1 . . . MaxNrofAvailableBW) of AvailableBW)
AvailableBW::=sequence {
AvailableBW_ID//indicating an index ID of an available bandwidth
Subcarrierspacing//indicating a subcarrier spacing corresponding to the available bandwidth corresponding to the ID
UnavailableBandwidthInfo//indicating unavailable bandwidth information
UnavailableResourceInfo//indicating an unavailable resource of the available bandwidth corresponding to the ID (implicitly indicating guard band information)}
MaxNrofAvailableBW//indicates a maximum quantity of all available bandwidth combinations that is supported.

Similarly, it is not difficult to understand that the foregoing configuration information corresponds to content included in the following Table 3 (values in Table 3 are merely used to describe the solution, and do not constitute a limitation).

TABLE 3

| Available bandwidth index (AvailableBW_ID) | Unavailable bandwidth information (Unavailable BandwidthInfo) | Subcarrier spacing Subcarrier-spacing | Unavailable resource information (Unavailable-ResourceInfo) |
|---|---|---|---|
| 1 | Subband 1 | 60 kHz | RBs #0 to #27 |
| 2 | Subband 2 | 60 kHz | RBs #24 to #54 |
| 3 | Subband 3 | 60 kHz | RBs #51 to #81 |
| 4 | Subband 4 | 60 kHz | RBs #78 to #106 |
| 5 | Subbands 1 + 2 | 60 kHz | RBs #0 to #54 |
| 6 | Subbands 1 + 3 | 60 kHz | RBs #0 to #27, and RBs #51 to #81 |
| 7 | Subbands 1 + 4 | 60 kHz | RBs #0 to #27, and RBs #78 to #106 |
| 8 | Subbands 2 + 3 | 60 kHz | RBs #24 to #81 |
| 9 | Subbands 2 + 4 | 60 kHz | RBs #24 to #54, and RBs #78 to #106 |
| 10 | Subbands 3 + 4 | 60 kHz | RBs #51 to #106 |
| 11 | Subbands 1 + 2 + 3 | 60 kHz | RBs #0 to #81 |
| 12 | Subbands 1 + 2 + 4 | 60 kHz | RBs #0 to #54, and RBs #78 to #106 |
| 13 | Subbands 1 + 3 + 4 | 60 kHz | RBs #0 to #27, and RBs #51 to #106 |
| 14 | Subbands 2 + 3 + 4 | 60 kHz | RBs #24 to #106 |
| 15 | Subbands 1 + 2 + 3 + 4 | 60 kHz | RBs #0 to #106 |

It may be understood that for different bandwidth BWPs, quantities of RBs corresponding to different subcarrier spacing scenarios may be other values; a position relationship between an RB corresponding to each subband and an RB corresponding to a wideband BWP may be another manner; and the size of the guard band may be another value according to different requirements on signal energy leakage, and for devices with different capabilities, the size of the guard band may also be different. The value used in any one of the foregoing implementation solutions is merely used as an example for description, and constitutes no limitation.

Figure 11:
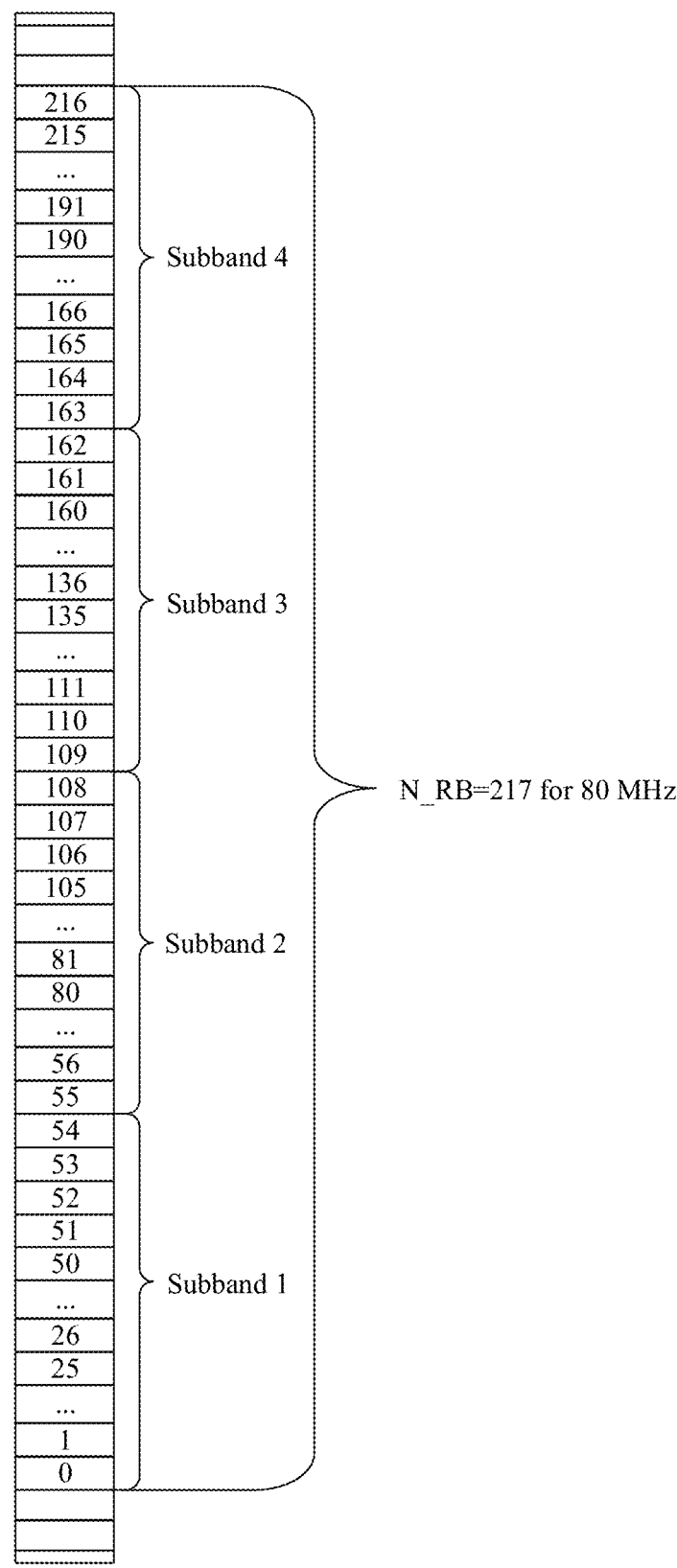

Any one of the foregoing indication solutions may be used for another subcarrier spacing scenario, for example, a 30 kHz subcarrier scenario or a 15 kHz subcarrier scenario. For example, referring to FIG. 11, a BWP of an 80 MHz bandwidth and a subcarrier spacing of 30 kHz correspond to 217 RBs. For an indication of a configured bandwidth, the base station may directly define, by using a system message or RRC signaling and position information of the bandwidth, one or more of a subcarrier spacing, a start RB, and an end RB that correspond to the configured bandwidth, a quantity of RBs corresponding to the configured bandwidth, or the like, and the UE may learn of an actual frequency domain position of the configured bandwidth based on the indication information, for example, based on the subcarrier spacing, the start RB, and the corresponding total quantity of RBs. Further, a plurality of subbands obtained by dividing the BWP may also be indicated. One or a combination of a quantity of subbands, a start RB, an end RB, and a quantity of RBs corresponding to each subband, or the like is indicated, so that the UE can accurately learn, based on the indication information, of a frequency domain position corresponding to the BWP, a corresponding resource block position, a frequency domain position of each subband, and a corresponding resource block position. As shown in FIG. 11, the 30 kHz subcarrier spacing may be notified by using a system message/RRC signaling, and RBs corresponding to the BWP of the 80 MHz bandwidth are an RB #0 to an RB #216. A total of 55 RBs, namely, the RB #0 to the RB #54, corresponding to a subband 1, a total of 54 RBs, namely, the RB #56 to the RB #108, corresponding to a subband 2, a total of 54 RBs, namely, the RB #109 to the RB #162, corresponding to a subband 3, and a total of 54 RBs, namely, the RB #163 to the RB #216, corresponding to a subband 4 may be further indicated. The subband may alternatively be obtained through division in another manner. This is not limited. For a detailed indication manner, refer to the foregoing implementation. Details are not described herein again.

Figure 12:
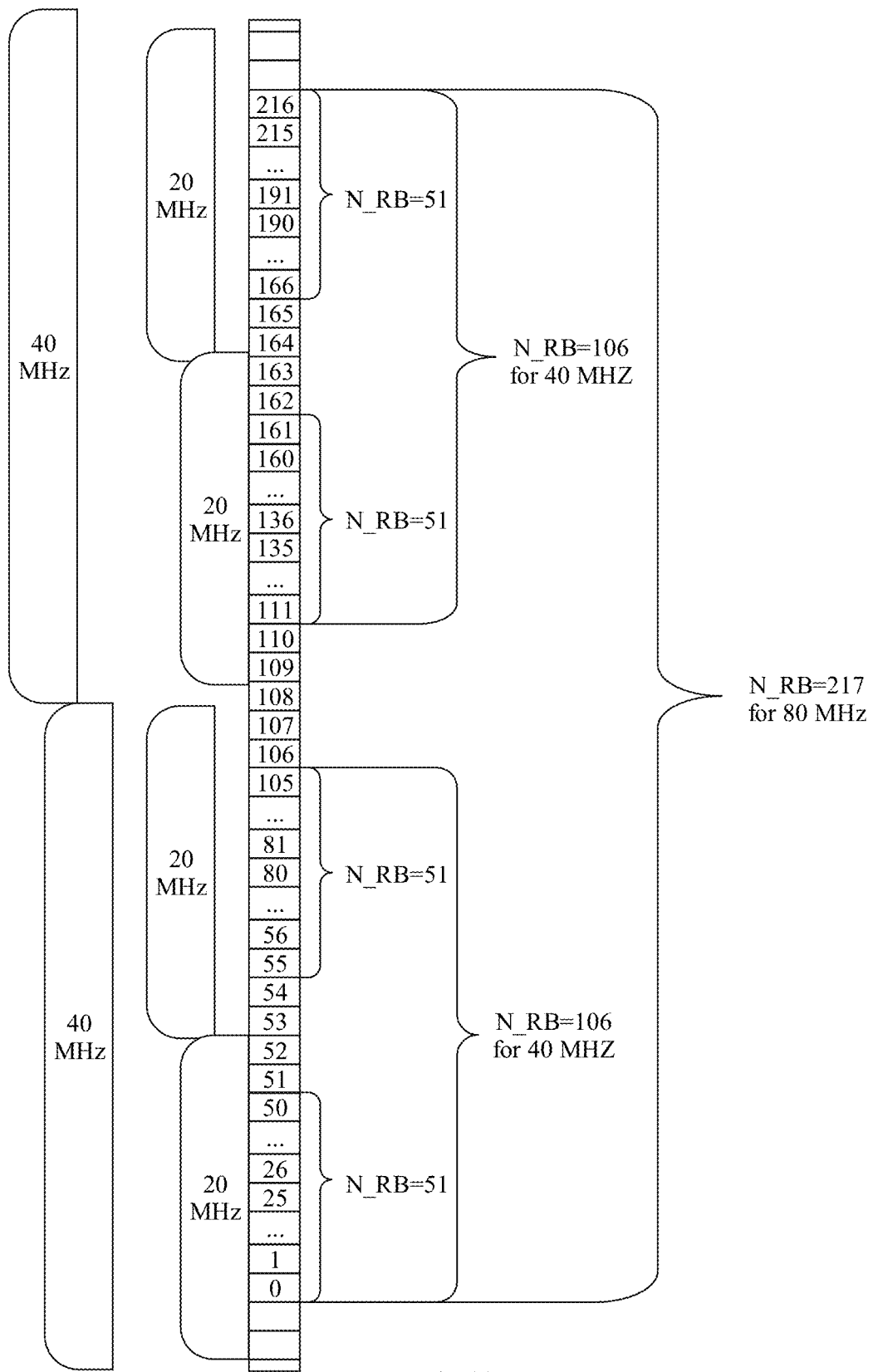

Further, one or more BWPs may be further configured on this basis. Optionally, RBs corresponding to any two adjacent BWPs may be consecutive or nonconsecutive. As shown in FIG. 12, one or more BWPs may be further configured on the basis that an 80 MHz BWP is configured, for example, one or more 20 MHz BWPs and/or one or more 40 MHz BWPs are configured. RBs corresponding to four 20 MHz BWPs are respectively: an RB #0 to an RB #50, an RB #55 to an RB #105, an RB #111 to an RB #161, and an RB #166 to an RB #216, and each 20 MHz BWP corresponds to 51 RBs. Two 40 MHz BWPs correspond to 106 RBs that are respectively: the RB #0 to the RB #105 and the RB #111 to the RB #216. It may be understood that a quantity of RBs corresponding to each BWP may alternatively be another value, and specific distribution may alternatively be implemented by using another solution. This is not limited in the implementations of the present invention.

Correspondingly, both the indication of the available bandwidth and the indication of the guard band information may use a solution similar to that in the foregoing 60 kHz subcarrier scenario. Details are not described herein again. Similarly, a similar indication is used for a 15 kHz subcarrier.

Optionally, in any one of the foregoing implementation solutions, a resource may be indicated by using an RB as a basic unit, and optionally, may be indicated by using an RB group (RBG), a subcarrier, a subcarrier set, or the like as a basic unit.

In another possible implementation, the guard band information is predefined in a standard protocol, in other words, does not need to be indicated by using signaling. However, in a standard protocol such as 38.101 or 38.104, guard band information, such as a size and a position, needs to be clearly stipulated. Optionally, corresponding guard band information may be stipulated based on one or any combination of different configured bandwidths, different subcarrier spacings, different device capabilities, or different available bandwidth scenarios. An example is shown in Table 4. Optionally, unified guard band information may be stipulated. That is, a same guard band principle is used in all scenarios. For example, it is stipulated that an intra-carrier guard band needs to satiety the following condition: When the available bandwidth includes one or more subbands, an intra-carrier guard band in each subband is equal to X % of a bandwidth of the subband, for example, X=10 or another value. Alternatively, optionally, an absolute size of the intra-carrier guard band, for example, X MHz, is stipulated. In addition, as mentioned above, the guard band may alternatively be configured based on the unavailable bandwidth, and the guard band may be a part of bandwidth that is beyond the unavailable bandwidth and that is continuous with the unavailable bandwidth, and a size is, for example, N % of the unavailable bandwidth, for example, N=5, 10, or another value.

A plurality of consecutive subbands may be considered as a larger subband, or optionally, considered as a plurality of independent subbands. Particularly, for devices with different capabilities, different X values may be defined. For example, for a device with a relatively strong capability, an intra-carrier guard band in each subband is equal to 5% of a bandwidth of the subband, and for a device with a relatively poor device capability, an intra-carrier guard band is equal to 10% of a bandwidth of the subband, thereby ensuring that resource utilization is maximized while interference is reduced. In this case, the base station only needs to notify the UE of the bandwidth configuration information and the available bandwidth information, and the UE may learn, according to stipulations in the standard protocol, of a resource position corresponding to the guard band, and further learn of resources on which data needs to be received. Optionally, when the resource position of the guard band is determined, calculation needs to be performed based on a subcarrier spacing. For example, FIG. 6 is still used as an example for description. For an 80 MHz BWP, after LBT is performed, an available bandwidth corresponds to subbands 1, 2, and 4. Optionally, the subbands 1 and 2 may be considered as a consecutive 40 MHz subband. A guard band at a boundary of a corresponding subband needs to meet 10% of the subband, that is, 4 MHz. Therefore, for a 60 kHz subcarrier spacing, a quantity of resources corresponding to the guard band should be obtained by rounding down or rounding up 4/0.72, that is, five or six RBs. In this case, an RB actually corresponding to the guard band may be further determined based on a subband division indication. In addition, optionally, the subbands 1 and 2 may alternatively be considered as two independent subbands, and because the subbands 1 and 2 are consecutive, no guard band is required between the subbands 1 and 2. At a boundary of the subband 2 and a subband 3, a guard band needs to meet 10% of the subband 2, that is, 2 MHz. In this case, for the 60 kHz subcarrier spacing, a quantity of resources corresponding to the guard band should be obtained by rounding down or rounding up 2/0.72, that is, two or three RBs. In this case, an RB actually corresponding to the guard band may be further determined based on a subband division indication. For another bandwidth scenario and another subcarrier spacing scenario, a similar solution is used, and details are not described again.

In the foregoing illustrative example, based on a predefined distribution diagram of resource blocks in different bandwidths, for example, any one of FIG. 7 to FIG. 12, a transmit end may not send a guard band indication, and a receive end (e.g., a terminal) may determine, based on a received indication of an available bandwidth and stipulated guard band information (the foregoing X), a specific position and size of a guard band (for current communication), or a bandwidth to be used. The resource block distribution diagram includes a size and a position of one or more resource blocks included in each subband or BWP in a bandwidth. For details, refer to any one of or a variant of the resource block distribution diagrams in FIG. 7 to FIG. 12. In this implementation, only 80 MHz is used as an example, and resource block distribution when a bandwidth is 20 MHz, 40 MHz, 160 MHz, or 320 MHz may also be stipulated. For example, resource blocks in a 40 MHz bandwidth may be a first half part or a second half part of the foregoing 80 MHz bandwidth.

TABLE 4

| Device capability | Configured Bandwidth (MHz) | Size (MHz) of a subband forming an available bandwidth | Subcarrier spacing (kHz) | Intra-carrier guard band (a quantity of RBs) in the subband of the available bandwidth |
|---|---|---|---|---|
| 1 | 80 | 60 | 60 | 3 |
| 1 | 80 | 40 | 60 | 2 |
| 1 | 80 | 20 | 60 | 1 |
| 2 | 80 | 60 | 60 | 4 |
| 2 | 80 | 40 | 60 | 3 |
| 2 | 80 | 20 | 60 | 2 |
| 1 | 60 | 40 | 60 | 2 |
| 1 | 60 | 20 | 60 | 1 |
| 2 | 60 | 40 | 60 | 3 |
| 2 | 60 | 20 | 60 | 2 |
| 1 | 80 | 60 | 30 | 6 |
| 1 | 80 | 40 | 30 | 4 |
| 1 | 80 | 20 | 30 | 2 |
| ... | ... | ... | ... | ... |

In another implementation, the base station may further dynamically indicate guard band information by using DCI information. Optionally, a direct indication manner may be used to add a new field to the DCI or design new DCI for a guard band indication. Specifically, a resource position corresponding to a guard band may be directly indicated in the DCI. For example, one or more of a start resource index, an end resource index, a resource quantity, all resource indexes, or the like corresponding to the guard band are indicated. Optionally, an implicit indication manner may be used in the DCI. For example, information about a resource actually used for transmission is indicated in the DCI. It may be understood that the resource that can be actually used for transmission should be equal to a remaining resource obtained after the resource corresponding to the guard band is subtracted from the available bandwidth. Specifically, one or more of a start resource index, an end resource index, a resource quantity, all resource indexes, or the like corresponding to the resource actually used for transmission may be indicated. Optionally, an implicit indication manner may be used to indicate information about a resource that is actually not used for transmission. It may be understood that the resource that is actually not used for transmission should be equal to a union set of a resource corresponding to an actual unavailable bandwidth and a resource for the guard band. Specifically, one or more of a start resource index, an end resource index, a resource quantity, all resource indexes, or the like corresponding to a resource actually used for transmission may be indicated.

Implementation of an Indication of a Configured Intra-Carrier Guard Band

In a possible manner, the base station configures one or more LBT bandwidths for the UE, and configures one or more intra-carrier guard bands. The base station includes, in a system message or RRC signaling, an indication used to indicate resource position information of the one or more intra-carrier guard bands. In other words, the base station may further explicitly indicate the resource position information of the one or more intra-carrier guard bands. The LBT bandwidth may be understood as a subband, or may be represented as a subband. The base station may perform LBT on the one or more LBT bandwidths, determine, based on an LBT result, whether to send or receive data in the one or more intra-carrier guard bands, and explicitly indicate (e.g., by using dynamic signaling) or implicitly indicate (e.g., by using a preset rule) the UE to receive downlink data or send uplink data in the one or more intra-carrier guard bands. The LBT result may include an LBT success (which may also be referred to as an LBT success) and an LBT failure. In different implementations, the LBT bandwidth may alternatively be an RB range, that is, the base station configures one or more RB ranges for the UE; or the LBT bandwidth may be an RB set, that is, the base station configures one or more RB sets for the UE.

The resource position information of the intra-carrier guard band may be represented by using a start resource index and an end resource index, and/or by using a start resource and a resource quantity, and/or in a manner of directly indicating a resource index. The resource may be a resource block RB, a subcarrier, a subcarrier set, or the like. For example, the base station may indicate a start RB index and an end RB index of the intra-carrier guard band to the UE, or the base station may indicate a start RB index of the intra-carrier guard band and a quantity of RBs occupied by the intra-carrier guard band to the UE.

Figure 13:
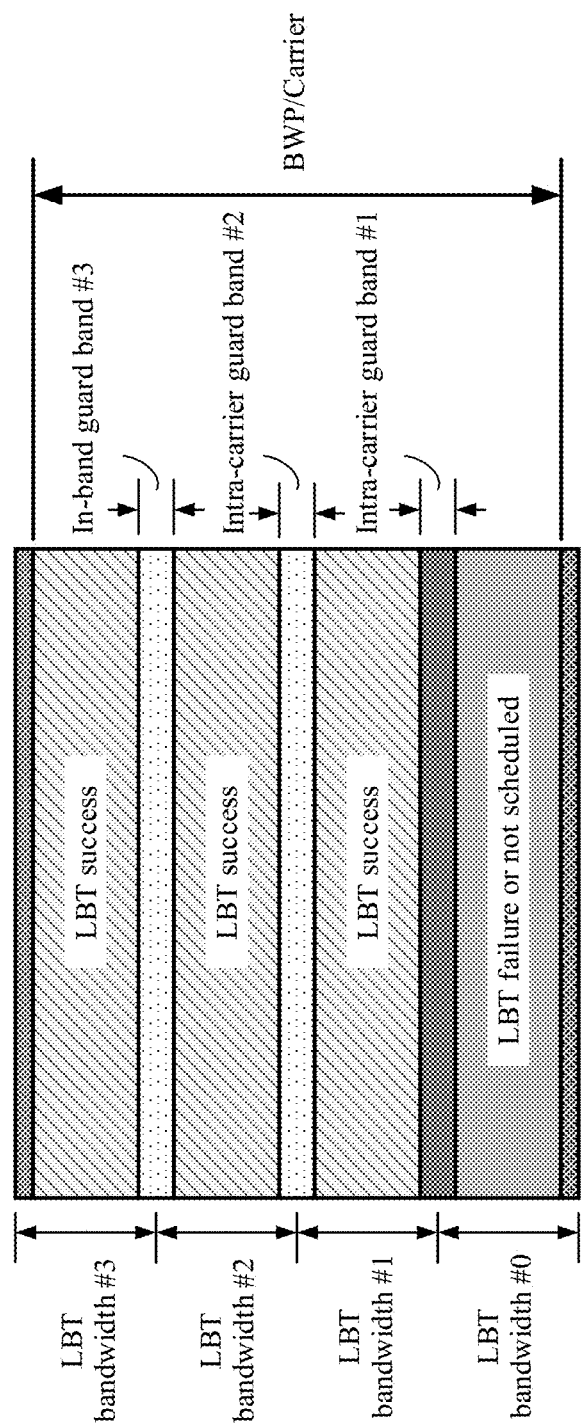
FIG. 13 is a schematic diagram of an intra-carrier guard band according to an illustrative example of this application.
Figure 14:
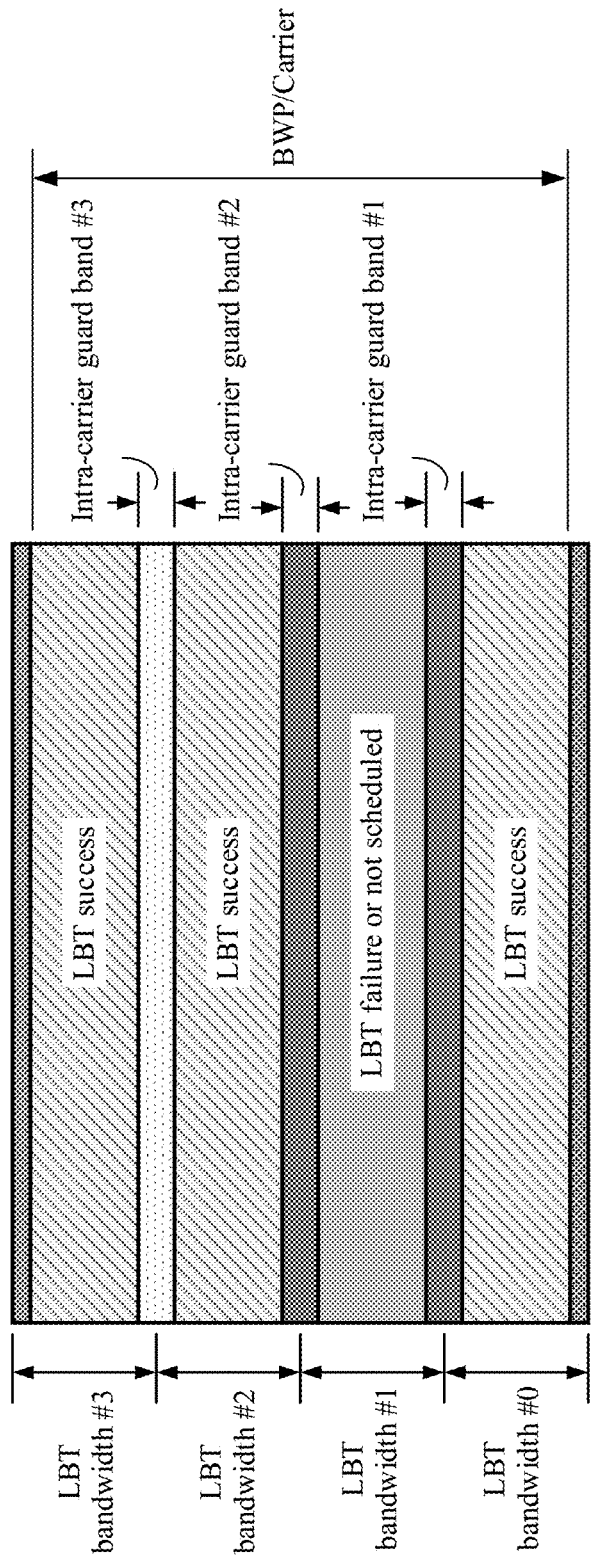
FIG. 14 is a schematic diagram of an intra-carrier guard band according to another illustrative example of this application.

For example, referring to FIG. 13 and FIG. 14, the base station configures a carrier or a BWP for the UE, where four LBT bandwidths are obtained through division. For ease of description, "LBT bandwidths #0 to #3" are used for representation. An intra-carrier guard band is configured between two adjacent LBT bandwidths, and three intra-carrier guard bands are configured between the four LBT bandwidths. For ease of description, "intra-carrier guard bands #1 to #3" are used for representation. The intra-carrier guard band may be configured by using a quantity of RBs, a quantity of subcarriers, or an absolute bandwidth. An 80 MHz BWP and a 60 kHz subcarrier spacing are used as an example. There are a total of 107 RBs that are respectively numbered #0 to #106. For example, frequency domain resources corresponding to the three intra-carrier guard bands are: a guard band #1: the RB #24 to the RB #27, a guard band #2: the RB #51 to the RB #54, and a guard band #3: the RB #78 to the RB #81. This is not limited in this application.

When the UE has one or more serving cells, the base station configures an intra-carrier guard band for some or all serving cells (per cell) of the UE. For example, the base station configures the foregoing intra-carrier guard band resource indication information for one serving cell. For example, signaling for configuring an intra-carrier guard band for a serving cell may be carried in a serving cell configuration (ServingCellConfig) or a serving cell common configuration (ServingCellConfigCommon). That is, the foregoing intra-carrier guard band resource indication information is configured in ServingCellConfig or ServingCellConfigCommon. For example, a group of parameters or a parameter may be added to servingcellconfig or ServingCellConfigCommon to indicate the resource position information, or a sequence may be used. For a same serving cell, uplink and downlink intra-carrier guard bands may be the same or different. When one or more BWPs are configured for the UE, the base station configures an intra-carrier guard band for some or all BWPs (per BWP) of the UE. For example, the base station configures the foregoing intra-carrier guard band resource indication information for one BWP. For example, signaling for configuring the intra-carrier guard band may be carried in an information element (IE) BWP, BWP downlink common (BWP-DownlinkCommon), BWP downlink dedicated (BWP-DownlinkDedicated), BWP uplink common (BWP-UplinkCommon), or BWP uplink dedicated (BWP-UplinkDedicated). For a same BWP, uplink and downlink intra-carrier guard bands may be the same or different.

For a downlink, the base station performs LBT on each LBT bandwidth before sending a downlink signal. For example, referring to FIG. 13, the base station successfully listens to the LBT bandwidths #1 to #3, and may send a downlink signal. The base station fails to listen to the LBT bandwidth #0 and cannot send a downlink signal. The base station may send downlink data in the intra-carrier guard bands #2 and #3, but cannot send a downlink signal in the intra-carrier guard band #1. For an uplink, if the UE is scheduled to send a PUSCH in the LBT bandwidths #1 to #3, the UE may send uplink data in the intra-carrier guard band #2 and the intra-carrier guard band #3. However, uplink data cannot be sent in the intra-carrier guard band #1. In different implementations, a subband on which LBT fails or is not scheduled may be on an edge of a carrier or a BWP (as shown in FIG. 13), or may be in the middle of a carrier or a BWP (as shown in FIG. 14).

During downlink transmission, the base station may configure, by using PDSCH-Config in RRC signaling, a rate match pattern (RMP) for a corresponding intra-carrier guard band that can be dynamically scheduled, and may indicate a rate match pattern corresponding to the intra-carrier guard band. For example, the RMP is used to configure that no PDSCH is mapped to an RB in the corresponding intra-carrier guard band. The intra-carrier guard band that can be dynamically scheduled may be all intra-carrier guard bands configured in a carrier or a BWP, or may be some intra-carrier guard bands configured in a carrier or a BWP. For example, referring to FIG. 15, a rate match pattern #1 (RMP #1) is configured for an intra-carrier guard band #1, and a rate match pattern #2 (RMP #2) is configured for an intra-carrier guard band #2.

In some implementations, a rate match pattern group (RMPG) may be further configured for the rate match pattern of the intra-carrier guard band. For example, referring to FIG. 15, the RMP #1 corresponding to the intra-carrier guard band #1 is added to an RMPG #1, and the RMP #2 corresponding to the intra-carrier guard band #2 is added to an RMPG #2.

Further, the base station indicates, by using an RMI in downlink control information (DCI), whether to map a PDSCH to an intra-carrier guard band. For example, the RMI is used to indicate whether the base station uses an RMPG. When the RMPG is used, the base station maps no PDSCH to an RB in a guard band corresponding to an RMP in the RMPG. When the RMPG is not used, the base station maps a PDSCH to an RB in a guard band corresponding to an RMP in the RMPG. The UE determines, based on the RMI, whether to receive a PDSCH. For example, the RMI may be 2 bits in a DCI format 1-1. A most significant bit (MSB) in the RMI is used to indicate whether the base station uses the RMPG #1, and a least significant bit (LSB) in the RMI is used to indicate whether the base station uses the RMPG #2. It is determined, based on an indication of the downlink control information, whether a PDSCH is mapped to the RB in the intra-carrier guard band corresponding to the RMP included in the RMPG. For example, a bit value "0" indicates that a PDSCH can be mapped to a corresponding intra-carrier guard band resource; a bit value "1" indicates that no PDSCH is mapped to a corresponding intra-carrier guard band resource; the RMI="00" indicates that a PDS CH can be mapped to intra-carrier guard band resources corresponding to a union set of the RMPG #1 and the RMPG #2, that is, a PDSCH can be mapped to each of the intra-carrier guard band #1 and the intra-carrier guard band #2; the RMI="10" indicates that no PDSCH is mapped to an intra-carrier guard band resource corresponding to the RMPG #1, and a PDSCH can be mapped to an intra-carrier guard band resource corresponding to the RMPG #2, that is, no PDSCH is mapped to the intra-carrier guard band #1, and a PDSCH can be mapped to the intra-carrier guard band #2; the RMI="01" indicates that a PDSCH can be mapped to an intra-carrier guard band resource corresponding to the RMPG #1, and no PDSCH is mapped to an intra-carrier guard band resource corresponding to the RMPG #2, that is, a PDSCH can be mapped to the intra-carrier guard band #1, and no PDSCH is mapped to the intra-carrier guard band #2; the RMI="11" indicates that no PDSCH can be mapped to a union set of intra-carrier guard band resources corresponding to the RMPG #1 and the RMPG #2, that is, a PDSCH is mapped to neither the intra-carrier guard band #1 nor the intra-carrier guard band #2. In another implementation, a bit value "1" may indicate that no PDSCH can be mapped to a corresponding intra-carrier guard band resource, and a bit value "0" may indicate that a PDSCH can be mapped to a corresponding intra-carrier guard band resource.

Figure 15:
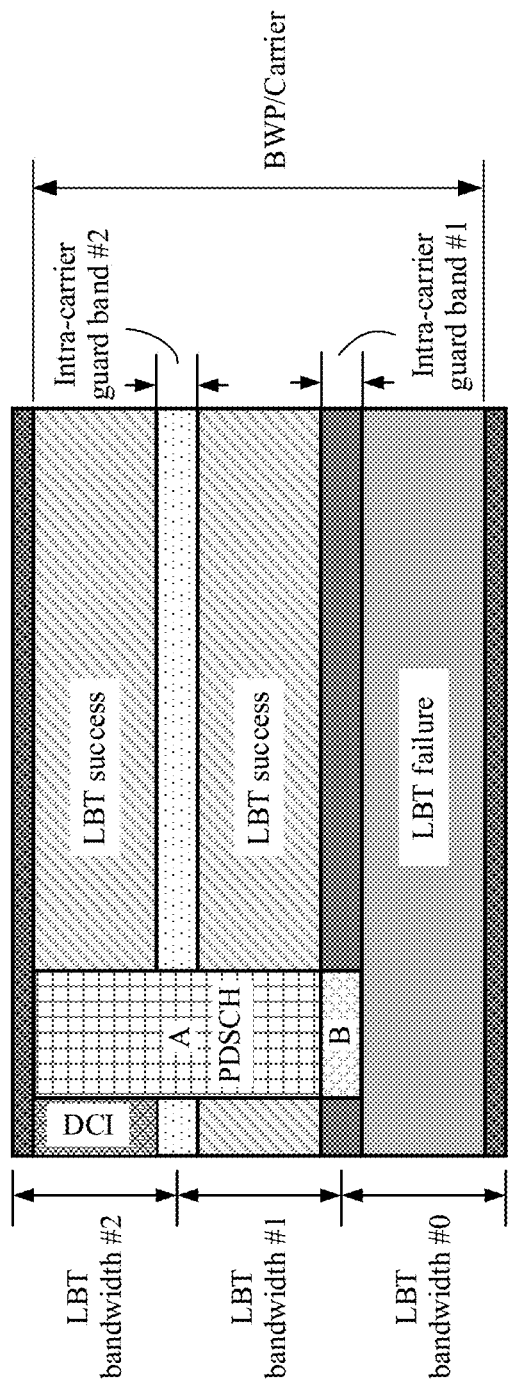
FIG. 15 is a schematic diagram of an intra-carrier guard band according to still another illustrative example of this application.

The UE reads the RMI in the DCI of the PDSCH to determine whether the base station maps the PDSCH to the intra-carrier guard band. Referring to FIG. 15, the PDSCH scheduled by using the DCI occupies two LBT bandwidths (the LBT bandwidths #1 and #2) and two intra-carrier guard bands (the intra-carrier guard bands #1 and #2). The UE learns, by using the RMI, that the base station maps the PDSCH to the intra-carrier guard band #2 (a block A shown in the figure), maps no PDSCH to the intra-carrier guard band #1 (a block B shown in the figure), and needs to perform rate match on the intra-carrier guard band #1.

It may be understood that, in another implementation, a quantity of RMPGs may be another value, and a quantity of RMPs included in the RMPG may be another value. Correspondingly, the base station may increase a quantity of RMPGs configured in higher layer signaling, that is, increase a quantity of bits of the RMI carried in the DCI, where each bit corresponds to one RMPG. Therefore, a prior-art problem that a quantity of intra-carrier guard bands indicated by a rate match indication method is limited is resolved, and communication efficiency is improved.

In some other implementations, the DCI may carry an intra-carrier guard band indicator (intra carrier guard band indicator, GBI), used to indicate whether a PDSCH is mapped to the intra-carrier guard band. For example, the GBI is carried in the DCI format 1-1. For different UEs, the base station may configure whether to include the GBI in the DCI format 1-1. The GBI occupies X bits in the DCI, and the X bits respectively correspond to intra-carrier guard bands. Each bit corresponds to one intra-carrier guard band configured by a higher layer. For example, a bit 0 indicates that no PDSCH is mapped to a frequency domain resource corresponding to the intra-carrier guard band, and a bit 1 indicates that a PDSCH is mapped to a frequency domain resource corresponding to the intra-carrier guard band. Alternatively, a bit 1 indicates that a PDSCH is mapped to a frequency domain resource corresponding to the intra-carrier guard band, and a bit 0 indicates that a PDSCH is mapped to a frequency domain resource corresponding to the intra-carrier guard band. When a frequency domain resource that overlaps the intra-carrier guard band is scheduled for the UE, rate match is performed on the overlapping frequency domain resource. For example, a quantity of bits of the GBI may be adjusted based on a quantity of intra-carrier guard bands, or a quantity of bits of the GBI may be a maximum quantity of intra-carrier guard bands that can be configured in a system, and N LSBs or N MSBs in the X bits are used as indication bits (N≤X) for indicating the intra-carrier guard band.

FIG. 13 is used as an example. The base station configures three intra-carrier guard bands. "1" is used to indicate that no PDSCH can be mapped to a corresponding intra-carrier guard band, and "0" indicates that a PDSCH can be mapped to a corresponding intra-carrier guard band. The GBI="100" may be indicated in the DCI, and the first to the third bits respectively correspond to the intra-carrier guard bands #1 to #3. In this case, the UE may learn that no PDSCH can be mapped to the guard band #1. Similarly, the base station may indicate the GBI="110" in the DCI, which corresponds to the case in FIG. 14. It may be understood that, when a quantity of guard bands indicated by the GBI needs to be increased/decreased, a quantity of bits of the GBI may be increased/decreased.

In another implementation, the base station and the UE may agree on a default rule in a protocol. When the UE is configured to receive a GC-PDCCH that carries an available LBT bandwidth indication, after the UE detects an effective available bandwidth, the UE may determine, based on the available LBT bandwidth, whether the gNB maps a PDSCH to the intra-carrier guard band. For example, if LBT bandwidths on both sides of the intra-carrier guard band are available bandwidths, the base station maps a PDSCH to the intra-carrier guard band; otherwise, the base station maps no PDSCH to the intra-carrier guard band. Referring to FIG. 15, the UE detects that available LBT bandwidths indicated by the base station are the LBT bandwidth #1 and the LBT bandwidth #2. When the PDSCH scheduled by the DCI received by the UE occupies the LBT bandwidths #1 and #2, and the LBT bandwidths #1 and #2 are available bandwidths, it is determined that a PDSCH is mapped to the intra-carrier guard band #2 between the LBT bandwidths #1 and #2. For the intra-carrier guard band #1, because the LBT bandwidth #0 on one side of the intra-carrier guard band #1 is an unavailable bandwidth, the base station maps no PDSCH to the guard band #1. In an example, when the base station sends a GC-PDCCH at the beginning of a downlink burst, where bits of an available bandwidth indication carried in the GC-PDCCH is all "0"s or all "1"s, to indicate that the currently sent available bandwidth indication is invalid, and when the UE receives the bandwidth indication value, it may be considered that no PDSCH is mapped to the intra-carrier guard band.

In another example, based on fallback DCI (a DCI format 1-0) in NR, all configured intra-carrier guard bands are unavailable by default. When the terminal detects a PDSCH scheduled by using the fallback DCI, it may also be considered that the base station maps no PDSCH to the intra-carrier guard band, and a simplified signaling design can be used to reduce system overheads.

Figure 16:
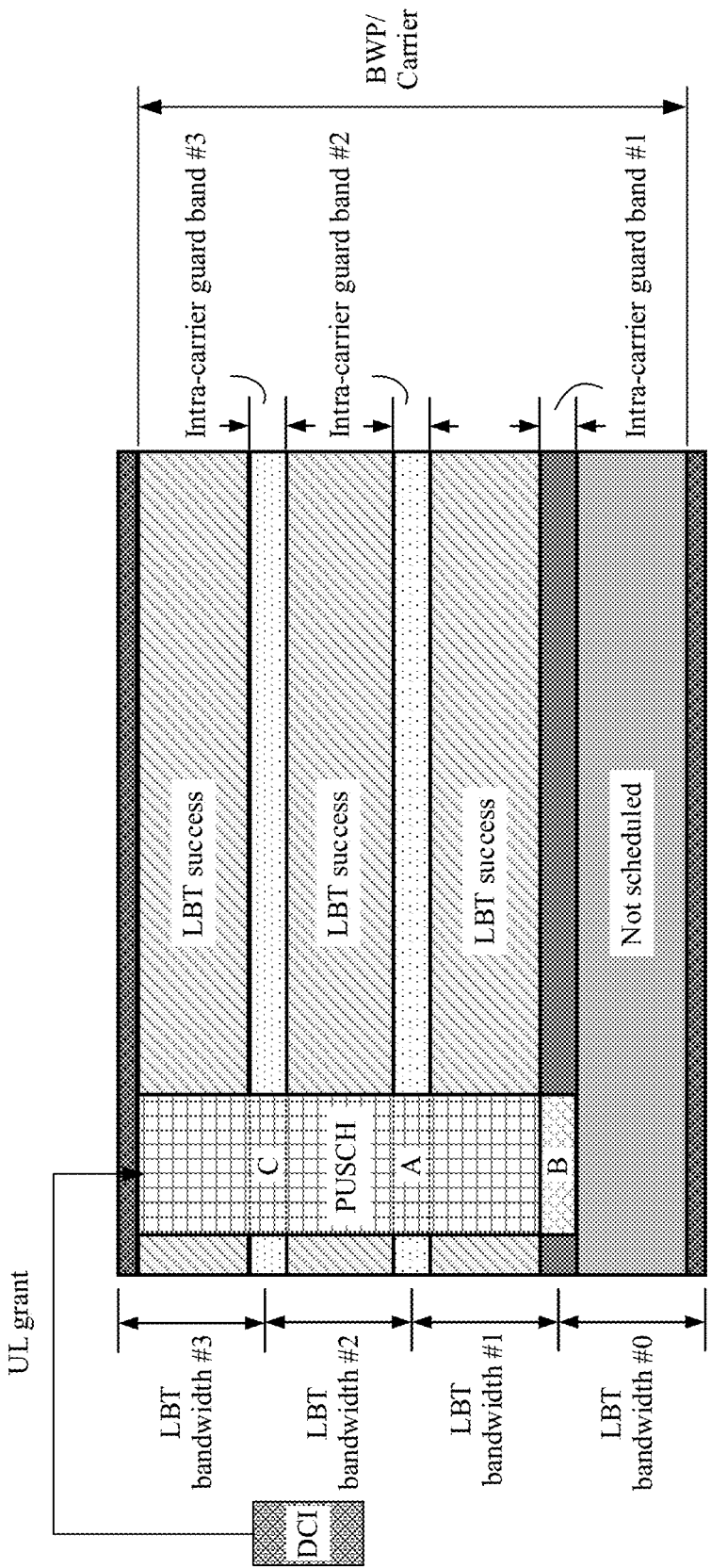
FIG. 16 is a schematic diagram of an intra-carrier guard band according to still another illustrative example of this application.

The foregoing describes sending and receiving of a downlink PDSCH. For sending and receiving of an uplink PUSCH, a method similar to that for sending and receiving of the downlink PDSCH may also be used. For example, the base station configures an RMI or a GBI in DCI for scheduling a PUSCH, to indicate the UE whether to map a PUSCH to an intra-carrier guard band that overlaps an allocated frequency domain resource. In some implementations, the UE can send the scheduled PUSCH only when LBT on all LBT bandwidths that overlap the scheduled PUSCH succeeds. In this case, 1 bit carried in the DCI (the DCI format 0-1) is used to indicate whether the UE maps a PUSCH to an intra-carrier guard band to which a PUSCH can be mapped, for example, the 1 bit may be the RMI or the GBI. It may be understood that, although both are referred to as the RMI/GBI, there may be a difference between an RMI/GBI mechanism on the uplink and an RMI/GBI mechanism on the downlink. For example, the base station may configure whether to add the 1 bit to the DCI format 0-1, for example, based on a capability of the UE. Further, the UE may determine, based on frequency domain scheduling information included in uplink scheduling DCI by the base station, specific intra-carrier guard bands to which a PUSCH can be mapped. For example, referring to FIG. 16, the DCI schedules the UE to send a PUSCH in the LBT bandwidths #1, #2, and #3 and the intra-carrier guard bands #2 and #3 (dashed blocks A and C), and not to send a PUSCH in the guard band #1 (a block B). Therefore, the UE maps a PUSCH to the guard band #2 and the guard band #3. Because an LBT result of the LBT bandwidth #0 is unknown, the UE cannot map a PUSCH to the guard band #1. The UE may determine, based on a dynamic indication of the base station, whether to map a PUSCH to the guard band #2 and the guard band #3. In an example, the base station may use fallback DCI (a DCI format 0-0) to schedule a PUSCH, and the UE may not map a PUSCH to an intra-carrier guard band that overlaps uplink scheduled frequency domain resource.

Related features of the illustrative examples may be cited from or combined with the foregoing illustrative examples or the following illustrative examples. Therefore, repeated parts are not described in detail again. In addition, a network device or a terminal (or a related module, a chip, a system, a computer program, or a storage medium) in the following apparatus illustrative examples or system illustrative examples may also be configured to perform the method provided in the illustrative examples of this application.

In the foregoing implementations, information about a configured bandwidth, an available bandwidth, a guard band, or the like is carried by using RRC, by being preset in a standard, by being indicated in DCI, or in another manner, to indicate intra-carrier guard band information in a wideband scenario to the UE.

In addition, on a receive side, the terminal or the UE may determine the guard band based on an indication of the configured bandwidth, the available bandwidth, and/or the guard band. In this way, interference caused by signal leakage can be avoided. In addition, a decoding probability can be improved, and system performance can be improved.

In the foregoing example specific implementations, the objectives and the technical solutions of this application are further described in detail. It should be understood that the foregoing descriptions are merely specific implementations of this application, but are not used to limit the protection scope of this application. Any modification, equivalent replacement, improvement, or the like made based on the technical solutions of this application shall fall within the protection scope of this application.

All or some of the foregoing illustrative examples may be implemented by software, hardware, firmware, or any combination thereof. When software is used to implement the illustrative examples, all or some of the illustrative examples may be implemented in a form of a computer program product. The computer program product includes one or more computer instructions. When the computer program instructions are loaded and executed on a computer, all or some of the procedures or the functions according to the illustrative examples of the present disclosure are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (e.g., a coaxial cable, an optical fiber, or a digital subscriber line (DSL)) or wireless (e.g., infrared, radio, or microwave) manner. The computer-readable storage medium may be any usable medium accessible by a computer, or a data storage device, such as a server or a data center, integrating one or more usable media. The usable medium may be a magnetic medium (e.g., a floppy disk, a hard disk, or a magnetic tape), an optical medium (e.g., a DVD), a semiconductor medium (e.g., a solid-state drive (SSD)), or the like.

What is claimed is:

1. A method, carried out by a network device, the method comprising:
   sending a guard band information, wherein the guard band information is carried by a radio resource control (RRC) signaling and the guard band information comprises:
      an information of a start resource block (RB) position, and
      a number of RBs corresponding to one or more guard bands in a bandwidth part (BWP); and
   sending an available bandwidth information that indicates one or more available RB sets in the BWP, wherein the one or more available RB sets are used to perform data transmission, and wherein each guard band of the one or more guard bands indicated by the guard band information is not in the one or more available RB sets.

2. A method, carried out by a terminal, the method comprising:
   receiving a guard band information that is carried by a radio resource control (RRC) signaling, wherein the guard band information comprises an information of:
      a start resource block (RB) position, and
      a number of RBs corresponding to one or more guard bands in a bandwidth part (BWP); and
   receiving an available bandwidth information that indicates one or more available RB sets in the BWP, wherein the one or more available RB sets are used to perform data transmission, and wherein each of the one or more guard bands indicated by the guard band information is not in the one or more available RB sets.

3. A communication apparatus for an unlicensed spectrum, comprising:
   at least on one processor, and
   a non-transitory computer-readable medium comprising computer-executable instructions that, when executed by the at least one processor, cause the communication apparatus to carry out a method comprising:
      sending a guard band information, wherein the guard band information is carried by a radio resource control (RRC) signaling and the guard band information comprises an information of a start resource block (RB) position and a number of RBs corresponding to one or more guard bands in a bandwidth part (BWP); and
      sending an available bandwidth information that indicates one or more available RB sets in the BWP, the one or more available RB sets are used to perform data transmission, and wherein each guard band of the one or more guard bands indicated by the guard band information is not in the one or more available RB sets.

4. A communication apparatus comprising:
   at least one processor, and
   a non-transitory computer-readable medium comprising computer-executable instructions that, when executed by the at least one processor, cause the communication apparatus to carry out a method comprising:
      receiving a guard band information that is carried by a radio resource control (RRC) signaling, wherein the guard band information comprises an information of:
         a start resource block (RB) position, and
         a number of RBs corresponding to one or more guard bands in a bandwidth part (BWP); and
      receiving an available bandwidth information that indicates one or more available RB sets in the BWP, wherein the one or more available RB sets are used to perform data transmission, and wherein each of the one or more guard bands indicated by the guard band information is not in the one or more available RB sets.

5. The method according to claim 1, the method further comprising:
   sending a configured bandwidth information for a terminal,
   wherein the available bandwidth information is determined based on the configured bandwidth information after listen before talk (LBT).

6. The method according to claim 2, the method further comprising:
   receiving a configured bandwidth information for the terminal,
   wherein the available bandwidth information is determined based on the configured bandwidth information after listen before talk (LBT).

7. The communication apparatus according to claim 3, the communication apparatus to carry out a method is further comprising:
   sending a configured bandwidth information for a terminal,
   wherein the available bandwidth information is determined based on the configured bandwidth information after listen before talk (LBT).

8. The communication apparatus according to claim 4, the communication apparatus to carry out a method is further comprising:
   receiving a configured bandwidth information for the terminal,
   wherein the available bandwidth information is determined based on the configured bandwidth information after listen before talk (LBT).

9. The method according to claim 5, wherein the configured bandwidth information comprises location information and/or subcarrier spacing of the configured bandwidth, and
   wherein the location information comprises one or more pieces of information corresponding to the configured bandwidth taken from the group consisting of: the subcarrier spacing, a start RB, an end RB, and a quantity of RBs.

10. The method according to claim 6, wherein the configured bandwidth information comprises location information and/or subcarrier spacing of the configured bandwidth, and
    wherein the location information comprises one or more pieces of information corresponding to the configured bandwidth taken from the group consisting of: the subcarrier spacing, a start RB, an end RB, and a quantity of RBs.

11. The communication apparatus according to claim 7, wherein the configured bandwidth information comprises location information and/or subcarrier spacing of the configured bandwidth, and
   wherein the location information comprises one or more pieces of information corresponding to the configured bandwidth taken from the group consisting of: the subcarrier spacing, a start RB, an end RB, and a quantity of RBs.

12. The communication apparatus according to claim 8, wherein the configured bandwidth information comprises location information and/or subcarrier spacing of the configured bandwidth, and
   wherein the location information comprises one or more pieces of information corresponding to the configured bandwidth taken from the group consisting of: the subcarrier spacing, a start RB, an end RB, and a quantity of RBs.

13. The method according to claim 2, the method further comprising:
   determining a resource for receiving data based on the guard band information, the available bandwidth information and the configured bandwidth information.

14. The communication apparatus according to claim 4, wherein the method further comprises:
   determining a resource for receiving data based on the guard band information, the available bandwidth information and the configured bandwidth information.

* * * * *